United States Patent
Couchot et al.

(10) Patent No.: US 11,655,407 B1
(45) Date of Patent: May 23, 2023

(54) DROP-IN RECYCLED REFRIGERANT COMPOSITIONS HAVING NO NET GWP REPLACING R-410A

(71) Applicant: The Coulan Company, L.L.C., Clayton, NC (US)

(72) Inventors: David L. Couchot, Mason, OH (US); Abiral Mainali, Raleigh, NC (US); Raymond E. Maloney, Clayton, NC (US); Harold B. Kivlan, IV, Clayton, NC (US)

(73) Assignee: The Coulan Company, L.L.C., Clayton, NC (US)

( * ) Notice: Subject to any disclaimer, the term of this patent is extended or adjusted under 35 U.S.C. 154(b) by 0 days.

(21) Appl. No.: 18/146,554

(22) Filed: Dec. 27, 2022

(51) Int. Cl.
C09K 5/04 (2006.01)
C10M 105/38 (2006.01)
B01D 3/14 (2006.01)
C10N 40/30 (2006.01)

(52) U.S. Cl.
CPC .............. *C09K 5/045* (2013.01); *B01D 3/143* (2013.01); *C10M 105/38* (2013.01); *C09K 2205/122* (2013.01); *C09K 2205/22* (2013.01); *C10M 2207/2835* (2013.01); *C10N 2040/30* (2013.01)

(58) Field of Classification Search
None
See application file for complete search history.

(56) References Cited

U.S. PATENT DOCUMENTS

| | | | | |
|---|---|---|---|---|
| 4,978,467 A | * | 12/1990 | Shankland | C11D 7/505 252/364 |
| 5,744,052 A | * | 4/1998 | Bivens | C09K 5/045 510/410 |
| 5,916,252 A | * | 6/1999 | Yoshida | F25B 43/003 62/502 |
| 8,568,608 B2 | * | 10/2013 | Shiflett | C10M 171/008 62/84 |
| 2007/0284078 A1 | * | 12/2007 | Leek | C09K 5/045 252/67 |
| 2011/0204279 A1 | * | 8/2011 | Minor | C08J 9/149 165/104.11 |

(Continued)

FOREIGN PATENT DOCUMENTS

WO  WO 2006135356 A1 * 12/2006

OTHER PUBLICATIONS

CN 105349105 A, Published (Year: 2016).*

Primary Examiner — Joseph D Anthony
(74) Attorney, Agent, or Firm — Robert Goozner

(57) ABSTRACT

A refrigerant composition includes about 63-66 wt % difluoromethane and about 33-36 wt % pentafluoroethane. The refrigerant composition is formed from all recycled materials, and the refrigerant composition has a net global warming potential of about 0. A method of preparing the refrigerant composition includes injecting a mixture of recovered refrigerants into the center of a distillation column, the mixture of injected refrigerants being difluoromethane, pentafluoroethane and chlorodifluoromethane, removing from the top of the distillation column a refrigerant composition of about 63-66 wt % difluoromethane and about 33-36 wt % pentafluoroethane, and removing chlorodifluoromethane from the bottom of the distillation column.

20 Claims, 15 Drawing Sheets

(56) References Cited

U.S. PATENT DOCUMENTS

2015/0121910 A1* 5/2015 Yana Motta ............ F28D 15/00
  62/77
2016/0215192 A1* 7/2016 Minor .................... C09K 5/045
2016/0362591 A1* 12/2016 Yana Motta ............ F25B 45/00

* cited by examiner

ODS Refrigerant Reclamation Totals by Year (pounds)

| | CFC-11 | CFC-12 | CFC-13 | CFC-113 | CFC-114 | R-502 | HCFC-22 | HCFC-123 | HCFC-124 | R-500 | R-503 | Total |
|---|---|---|---|---|---|---|---|---|---|---|---|---|
| 2000 | 1,548,734 | 1,679,526 | 1,978 | 229,954 | 182,544 | 619,579 | 7,094,995 | 250,811 | - | 245,530 | - | 11,853,651 |
| 2001 | 1,182,130 | 1,296,745 | 1,485 | 162,572 | 100,581 | 249,604 | 4,320,103 | 212,568 | - | 188,981 | - | 7,714,769 |
| 2002 | 1,411,133 | 1,237,060 | 343 | 143,404 | 288,084 | 330,170 | 4,915,809 | 179,481 | - | 184,104 | 8,591 | 8,698,179 |
| 2003 | 903,731 | 623,245 | - | 110,425 | 394,091 | 90,749 | 4,356,619 | 110,022 | - | 90,344 | - | 6,679,226 |
| 2004 | 1,188,360 | 720,181 | - | 129,134 | 281,958 | 105,536 | 7,231,013 | 250,842 | - | 137,300 | - | 10,044,324 |
| 2005 | 985,184 | 593,345 | - | 107,985 | 70,086 | 55,181 | 6,172,133 | 319,539 | - | 74,278 | - | 8,377,731 |
| 2006 | 1,188,230 | 738,482 | - | 133,511 | 48,824 | 113,879 | 8,535,423 | 318,241 | - | 96,668 | - | 11,173,258 |
| 2007 | 891,687 | 460,594 | 1,389 | 162,773 | 26,400 | 75,431 | 8,191,322 | 227,323 | - | 41,518 | - | 10,078,437 |
| 2008 | 989,234 | 476,726 | - | 175,568 | 310,321 | 88,040 | 10,045,071 | 272,583 | - | 195,724 | 60 | 12,553,327 |
| 2009 | 1,026,824 | 212,638 | 224 | 135,301 | 16,554 | 136,936 | 7,544,327 | 436,463 | - | 118,847 | 46 | 9,628,160 |
| 2010 | 713,747 | 350,139 | 212 | 170,130 | 77,161 | 27,522 | 7,907,536 | 316,595 | 270 | 107,808 | 13 | 9,671,133 |
| 2011 | 719,036 | 291,869 | 68 | 151,887 | 327,537 | 41,448 | 8,290,406 | 335,760 | 74 | 43,430 | 30 | 10,201,545 |
| 2012 | 784,061 | 328,582 | 357 | 306,157 | 39,797 | 30,748 | 9,401,446 | 316,340 | 439 | 108,221 | 148 | 11,316,296 |
| 2013 | 736,126 | 372,521 | 185 | 36,166 | 415,399 | 15,689 | 8,701,264 | 445,854 | 1,088 | 48,616 | 395 | 10,773,303 |
| 2014 | 812,357 | 406,436 | 849 | 22,293 | 18,238 | 24,587 | 7,823,982 | 374,357 | 3,611 | 42,453 | 108 | 9,529,271 |
| 2015 | 740,543 | 288,302 | 118 | 217,007 | 6,370 | 15,771 | 7,811,832 | 399,683 | 199 | 33,171 | 32 | 9,513,028 |
| 2016 | 574,826 | 155,254 | 155 | 30,710 | 182,121 | 15,719 | 9,408,329 | 415,516 | 4,251 | 16,842 | 30 | 10,803,753 |
| 2017 | 905,045 | 263,957 | 1,292 | 86,361 | 10,461 | 27,206 | 8,680,022 | 592,256 | 396 | 32,665 | 184 | 10,599,845 |
| 2018 | 565,158 | 191,711 | 521 | 25,757 | 4,067 | 28,767 | 8,041,474 | 535,673 | 1,059 | 51,366 | 103 | 9,445,656 |
| 2019 | 486,525 | 152,386 | 338 | 54,990 | 13,790 | 43,786 | 7,821,260 | 581,941 | 10,378 | 30,893 | 23 | 9,196,310 |
| 2020 | 452,920 | 79,428 | 63 | 33,597 | 25,117 | 8,951 | 7,204,095 | 575,887 | 1,745 | 8,254 | 234 | 8,390,291 |

Note: Other CFCs and HCFCs that are reported in small quantities (e.g., CFC-115 and HCFC-142b) or that are contained in blends with non-ODS (e.g., R-408A) are excluded.

FIG. 11

HFC Refrigerant Reclamation Totals by Year (pounds)

| | HFC-23 | HFC-134a | HFC-227ea | HFC-404A | HFC-407A | HFC-407C | HFC-410A | Other HFCs | Total |
|---|---|---|---|---|---|---|---|---|---|
| 2017 | 1,175 | 1,858,132 | 154,655 | 486,719 | 111,255 | 167,445 | 2,103,404 | 207,481 | 5,090,266 |
| 2018 | 841 | 1,910,240 | 248,178 | 506,639 | 143,254 | 167,248 | 2,043,667 | 230,242 | 5,250,309 |
| 2019 | 642 | 2,399,952 | 1,810 | 485,338 | 105,435 | 213,668 | 2,596,861 | 256,034 | 6,059,740 |
| 2020 | 2,293 | 1,992,632 | 134 | 482,131 | 87,162 | 322,112 | 2,406,556 | 203,603 | 5,496,623 |

Mixed Refrigerant Received Totals by Year (pounds)

| 2010 | 2011 | 2012 | 2013 | 2014 | 2015 | 2016 | 2017 | 2018 | 2019 | 2020 |
|---|---|---|---|---|---|---|---|---|---|---|
| 77,038 | 121,718 | 86,146 | 93,807 | 113,883 | 221,159 | 924,475 | 375,671 | 975,271 | 774,472 | 907,371 |

Note: Mixed refrigerant is material received by reclaimers that contains multiple refrigerants, including ODS and HFCs, potentially in unknown quantities and composition.
These are not blends, which contain specific constituents at specific ratios. Mixed refrigerant totals are included in the Total Refrigerant Received table below.

Total Refrigerant Received Totals by Year (pounds)

| 2010 | 2011 | 2012 | 2013 | 2014 | 2015 | 2016 | 2017 | 2018 | 2019 | 2020 |
|---|---|---|---|---|---|---|---|---|---|---|
| 9,236,800 | 9,128,744 | 10,517,549 | 12,244,890 | 10,240,184 | 11,880,944 | 16,156,981 | 17,373,256 | 18,067,745 | 18,445,030 | 15,811,914 |

Note: Reclaimers were not required to include HFC refrigerants in reports of total amount received until 2017.

FIG. 11A

DROP-IN RECYCLED REFRIGERANT COMPOSITIONS HAVING NO NET GWP REPLACING R-410A

FIELD OF DISCLOSURE

The present disclosure generally relates to environmentally friendly recycled refrigerant compositions, that include pentafluoroethane and difluoromethane, suitable as a drop-in replacement for R-410A.

BACKGROUND

There is a great need for technologies or applications for mitigation or adaptation against climate change. This technology relates to the decarbonization of the atmosphere through effective means of reusing and repurposing legacy high Global Warming Potential (GWP) refrigerants that can replace virgin refrigerants in installed and new refrigerant applications.

As the industrial revolution moved from the nineteenth to the twentieth century, there was a shift from primarily mechanical, steam-driven technologies to technologies that derived energy from electricity and fossil fuels. The adoption of electricity sparked rapid development in refrigeration technologies that utilized fluorinated and chlorinated hydrocarbon refrigerants used in refrigeration, air conditioning, and heating equipment. Refrigerants used during the twentieth century were ozone-depleting substances (ODS) with high global warming potential (GWP). While burning fossil fuels undoubtedly released abundant amounts of carbon dioxide into the atmosphere, refrigerants vented to the atmosphere played a significant role in accelerating the global warming crisis heading into the twenty-first century. Consequently, there is a great need for innovative technology to control, reduce, and prevent anthropogenic emissions of greenhouse gases so we can reduce carbon pollution and manage the global warming crisis impacting our planet today.

Since the 1930s, R-12 ($CCl_2F_2$) and R-22 (1950's-$CHClF_2$) have been used as refrigerants in refrigeration and air conditioning equipment. R-12 is a chlorofluorocarbon (CFC) refrigerant, and R-22 is a hydrochlorofluorocarbon (HCFC) refrigerant. When released into the atmosphere, CFC and HCFC refrigerants are known to deplete the Earth's protective ozone layer and contribute to global warming. The United States signed the Montreal Protocol on Substances that Deplete the Ozone Layer (Montreal Protocol) in 1987 to establish a phase-out schedule that would ban the production and import of R-12 in 1996 and R-22 in 2020. In 1993, EPA enacted Section 608 of the Clean Air Act to establish proper refrigerant management procedures and a prohibition on venting ozone-depleting refrigerants into the atmosphere. Since R-12 and R-22 are single-molecule refrigerants, reclaimers commonly employed simplistic fractionation processes to reclaim R-12 and R-22 back to AHRI Standard 700, an economical way to ensure these refrigerants are recovered and reused instead of being purposely vented into the atmosphere.

In response to the Montreal Protocol, the industry began developing refrigerant technology around hydrofluorocarbon (HFC) refrigerants with no ozone-depleting characteristics. HFC refrigerant R-134A was introduced as a replacement for R-12 in automotive and transportation equipment in 1990. HFC refrigerant R-410A was introduced as a replacement for R-12 and R-22 in residential and light commercial comfort cooling equipment in 1991. During the early and mid-1990s, development work began on HFC refrigerant blends designed as retrofit replacements in most R-12 and R-22 equipment applications.

R-410A is an HFC refrigerant blend composed of 50 wt % difluoromethane $CH_2F_2$ (R-32) and 50 wt % pentafluoroethane $CHF_2CF_3$ (R-125), with a 100-year global warming potential that is 2,088 times greater than $CO_2$. Over the last ten years, approximately 50 million pounds of R-410A went into new and existing equipment annually. Equipment leaks and venting of R-410A, and other CFC, HCFC, and HFC refrigerants, persistently contribute to today's global warming crisis. The U.S. EPA reports that reclaimed HFC refrigerants accounted for only 1.6% of all refrigerants sold in the U.S. in 2020.

As HFC refrigerant blends gained acceptance as retrofit replacements for R-22, the unlawful mixing of HFC refrigerant blends with R-22 has led to an accumulation of complex HCFC/HFC/HC refrigerant mixtures that have no listing in the AHRI-700 Standard. The reclamation technology needed to address these off-spec refrigerant mixtures has been slow to develop, forcing service technicians to pay destruction fees for unknowingly recovering highly mixed refrigerants. The increase in mixed refrigerants and the reduction in U.S. reclamation rates suggests an upward trend in HCFC and HFC refrigerants (ODS and greenhouse gases) being vented to the atmosphere instead of being recovered and submitted to an EPA-certified reclaimer.

Worldwide refrigeration equipment manufacturers started developing low-GWP refrigerants and equipment technology to satisfy the global HFC phasedown mandated by the European Union's F-gas Regulations in 2015 and the Kigali Amendment to the Montreal Protocol in 2019. Equipment manufacturers adopted a growing number of low-GWP refrigerants for new equipment, including $CO_2$ (R-744), hydrocarbons, hydrofluoroolefins (HFOs), HFC-HFO blends, and the low-GWP HFC R-32. $CO_2$ has been used in many commercial refrigeration applications to replace R-404A and R-22; R-290 is a hydrocarbon used to replace R-134A in small residential and commercial applications; HFO R-1234yf replaced R-134A in automotive air conditioning; HFC-HFO blends R-448A, R-452B, and R-454B replaced R-404A in commercial refrigeration applications; and HFC R-32 replaced R-410A and R-407C in small residential split air conditioning systems.

The U.S. passed the American Innovation and Manufacturing (AIM) Act in 2020 and ratified the Kigali Amendment in 2022 to reduce the impact of HFC refrigerants on global warming. The AIM Act gave the U.S. Environmental Protection Agency (EPA) authority to establish a scheduled phasedown of HFC refrigerants and a requirement to recover, reclaim, and reuse or destroy HFC refrigerants contained within equipment being repaired or taken out of service. Starting in 2022, the HFC phasedown schedule gradually caps the consumption and production of HFC refrigerants until achieving an 85% reduction in baseline (average annual production and consumption from 2011 to 2013) by 2036, thus mirroring the Kigali Amendment to the Montreal Protocol. EPA uses an allowance as the unit of measure that controls production and consumption (imports). Each refrigerant is assigned a Metric Tons Exchange Value Equivalent (MTEVe) based on its GWP compared to $CO_2$, and entities receive their allowance allocation in MTEVe units. This legislation will keep the equivalent of 900 million tons of carbon dioxide emissions from reaching the atmosphere over time, a climate impact similar to preventing the combustion of one trillion tons of coal.

Adapting to the global phasedown of high-GWP refrigerants and passage of the AIM Act, the leading U.S. air conditioning equipment manufacturers have redesigned their residential and light commercial air conditioning equipment to utilize R-454B or R-32, refrigerants with lower GWP than R-410A (2,088 GWP). R-454B is a mildly flammable (A2L) HFC-HFO blend composed of 68.9 wt % difluoromethane $CH_2F_2$ (R-32) and 31.1 wt % 2,3,3,3-tetrafluoropropene $CH_2=CFCF_3$ (R-1234yf), with a GWP of 466. Similarly, R-32 is a mildly flammable (A2L) high-pressure, single-molecule HFC refrigerant with a GWP of 677. Industrywide adoption of low-GWP HFCs and HFC-HFO blends, such as R-32 and R-454B, does not provide a long-term decarbonization solution and strains the lifecycle management of R-32 and R-454B.

Though R-32 and R-125 are greenhouse gases, production and imports of R-32 and R-125 will persist so that manufacturers can charge new equipment and technicians can service the installed equipment base that contains R-410A, R-454B, or R-32. In 2029, the AIM Act will reduce HFC production and imports by 70%, and the market will require a supply of reclaimed R-32 and R-125 to make up for the shortfall in production and imports of R-32, R-125, R-410A, and R-454B. With nearly 1 billion pounds of HFC refrigerants in the installed equipment base and little enforcement of the prohibition on mixing refrigerants, the burden falls on EPA-certified reclaimers to develop novel and complex fractionation technology that can refine feed streams of complicated refrigerant mixtures that include HCFCs, HFCs, HFOs, hydrocarbons, and flammable components. From those feed streams, specific refrigerant components can be filtered out and purified back to AHRI Standard 700 to be reused in new and existing refrigeration equipment without additional global warming pollutants accumulating in the atmosphere. This process offsets the need for additional foreign production of greenhouse gases that will add to the global warming crisis if leaked or purposefully vented to the atmosphere.

Reclaimed refrigerants have a net-zero GWP because regulatory agencies account for their GWP value at the time of initial production or importation. No consumption or production allowance is needed to reclaim and reuse any refrigerant. Essentially, reclaimed refrigerants offset global production and prevent the imminent release of additional global warming pollutants. These recycled replacement materials will significantly assist in the global effort to decarbonize the atmosphere now and in the future.

The Background section of this document is provided to place embodiments of the present disclosure in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the disclosure or to delineate the scope of the disclosure. The sole purpose of this summary is to present some concepts disclosed herein in a simplified form as a prelude to the more detailed description that is presented later.

Briefly described, an embodiment of the disclosure relates to a refrigerant composition that includes R-125 (pentafluoroethane) and R-32 (difluoromethane) with properties that permit utilization as a drop-in replacement for R-410A in new and installed equipment.

In one embodiment, the refrigerant composition is formed from about 63-66 wt % difluoromethane, and about 34-36 wt % pentafluoroethane, where the composition is formed from all recycled materials, and the composition has a net global warming potential of about 0. The refrigerant composition may be formed from about 65 wt % difluoromethane and about 35 wt % pentafluoroethane. The refrigerant composition has properties similar to a mixture of 50 wt % difluoromethane and 50 wt % pentafluoroethane (R-410A).

In another embodiment, the refrigerant composition has a theoretical boiling point of about −59° F., a liquid phase pressure of about 219 psia at 70° F. and a vapor phase pressure of about 218 psia at 70° F. The refrigerant composition may have a liquid phase density of about 1.05 g/cm³ at 70° F. and a vapor phase density of about 0.05 g/cm³ at 70° F. The refrigerant composition may have a liquid phase enthalpy of about 0.24 kJ/g at 70° F., a vapor phase enthalpy of about 0.45 kJ/g at 70° F., a liquid phase entropy of about $6.2×10^{-4}$ kJ/gR at 70° F., a vapor phase entropy of about $1.0×10^{-3}$ kJ/gR at 70° F.

In another embodiment, a refrigerant mixture may be about 95-99.99 wt % of a refrigerant composition of about 63-66 wt % difluoromethane, and about 34-36 wt % pentafluoroethane, and about 0.01-5 wt % lubricant. The lubricant may be mineral oil, alkylbenzene oil and polyol ester. The lubricant may be an ester of at least one neopentyl polyol represented by the structural formula:

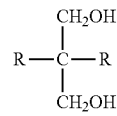

in which each R is independently selected from $CH_3$, $C_2H_5$ or $CH_2OH$.

In another embodiment, the refrigerant mixture can further include at least one of a UV dye or a sealant.

In another embodiment, a method of preparing a refrigerant composition includes injecting a mixture of reclaimed refrigerants into a center of a distillation column, the mixture of reclaimed refrigerants formed from difluoromethane, pentafluoroethane and chlorodifluoromethane, removing from a top of the distillation column a refrigerant composition of about 63-66 wt % difluoromethane and about 34-36 wt % pentafluoroethane, and removing chlorodifluoromethane from a bottom of the distillation column, where the refrigerant composition is formed from all recycled materials, and the refrigerant composition has a net global warming potential of about 0. The refrigerant may also be about 65 wt % difluoromethane, and about 35 wt % pentafluoroethane. In the method, the mixture of reclaimed refrigerants may also include 1,1,1,2-tetrafluoroethane. The refrigerant composition contains less than $1.0×10^{-22}$ wt % $H_2O$.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough

FIG. 11 shows the ODS refrigerant reclamation totals by year;

FIG. 11A shows HCF refrigerant reclamation totals by year, mixed refrigerant received totals by year and total refrigerant received totals by year;

DETAILED DESCRIPTION

Figure 1:
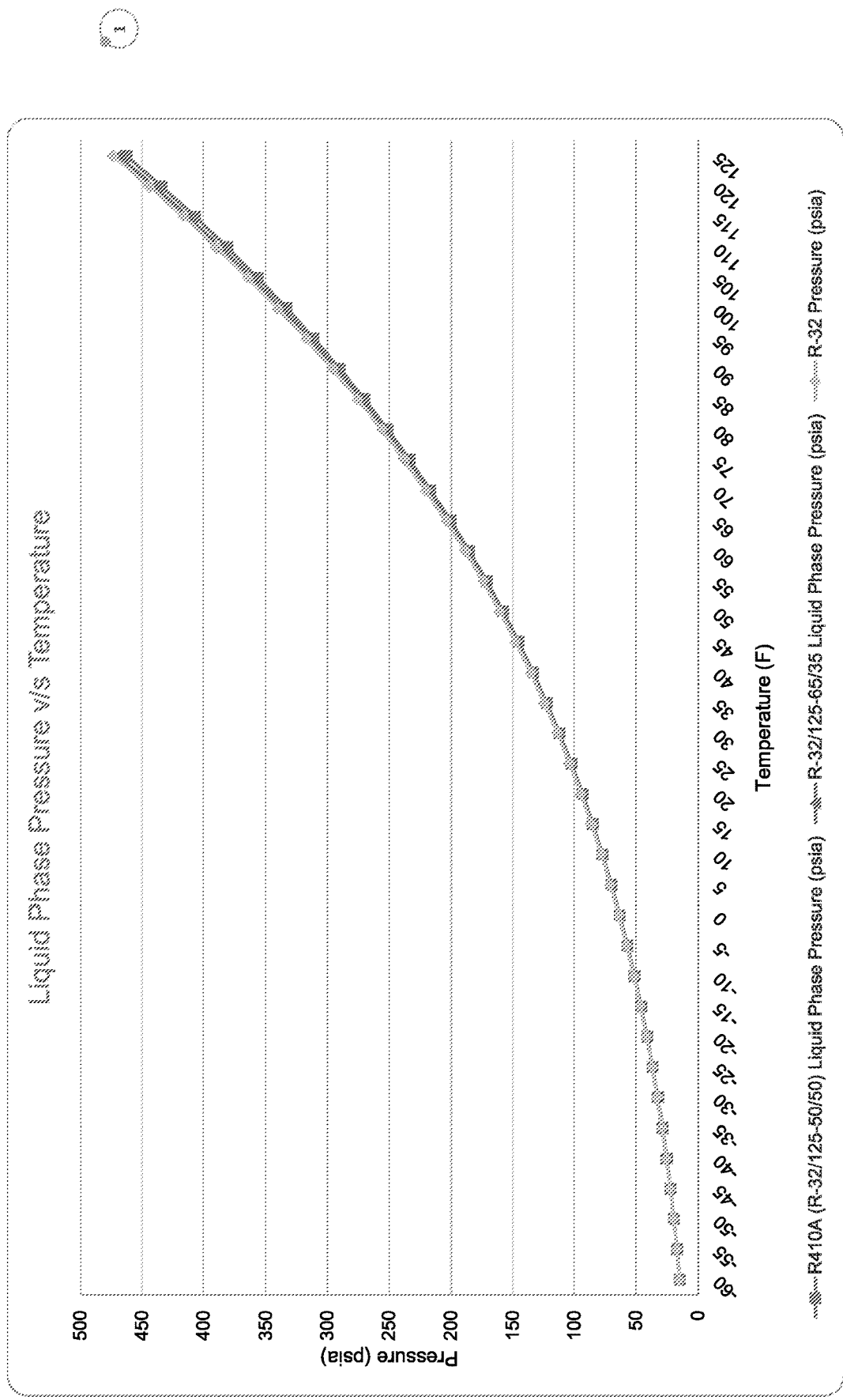
FIG. 1 depicts the liquid phase pressure-temperature curve of the refrigerant compositions of the disclosure compared to R-410A and R-32.

For simplicity and illustrative purposes, the present disclosure is described by referring mainly to exemplary embodiments thereof. In the following description, numerous specific details are set forth in order to provide a thorough understanding of the present disclosure. However, it will be readily apparent to one of ordinary skill in the art that the present disclosure may be practiced without limitation to these specific details.

With the combination of fractionation technology and reclaim technology, a formulation that has less flammability and can directly replace R-410A in new and the secondary gas for all R-410A applications at zero GWP by utilizing reclaim material and advanced reclamation technology. Additionally, the method of manufacturing this product is the most efficient and requires no additional products or energy consumption to make a working product.

The disclosure relates to a refrigerant mixture distilled from recovered refrigerants that is a drop-in replacement for R-410A and has a net GWP of zero. A typical mixture of recovered HFC refrigerants coming back to refrigerant reclamation facilities can be introduced to a distillation process to produce an HFC blend that will work as an R-410A substitute with equivalent levels of performance, reduced flammability characteristics, and net-zero GWP.

The nomenclature of the materials used in the disclosure is set forth in Table 1.

TABLE 1

Description of Refrigerant Materials

| Chemical Name | Formula | Designation |
|---|---|---|
| 1,1,1,2-tetrafluoroethane | $CF_3CH_2F$ | R-134A |
| pentafluoroethane | $CF_3CHF_2$ | R-125 |
| difluoromethane | $CHF_3$ | R-32 |
| chlorodifluoromethane | $CF_3Cl$ | R-22 |
| 1,1,1-trifluoroethane | $CF_3CH_3$ | R-143A |
| 2,3,3,3-tetrafluoropropene | $H_2C=CFCF_3$ | R-1234YF |
| 1,3,3,3-tetrafluoropropene | $CF_3CH=CHF$ | R-1234ZE |
| 50:50 R-32:R-125* | | R-410A |
| Hydrocarbon | $CH_3(CH2_n)CH_3$ | HC |

*Proportions in wt %.

The product of the disclosure is a replacement for R-410A primarily in home cooling applications like multi-family living and impacts nearly every person in the United States. There are 3 classifications of flammability in AHRI with R-410A (combination of R-32 and R-125), for example, receiving an A1 "non-flammable" category. In comparison, R-32 receives a "mildly flammable" designation. The disclosed formulation serves as a direct drop-in for R-410A in new applications as well as make-up gas for the installed equipment base, both of which are classified as A1. The disclosed formulation is shown in Table 2 below as a direct replacement for R-410A and is compared against a ratio of 65:35 (R32/R125) and a ratio of 80:20 (R32/R125), as well as R-32. The 65:35 R-32:R-125 product has no ASHRAE designation or close formulations because there is no known manufacturing process until now to make this product.

TABLE 2

Formulations of the Disclosure Compared to R-410A and R-32.

| Product | 65:35 R-32:R-125 Mixture | 80:20 R-32:R-125 Mixture | R-410A | R-32 |
|---|---|---|---|---|
| R-125 | 35.0 wt % | 20.0 wt % | 50.00 wt % | 0.00 wt % |
| R-32 | 65.0 wt % | 80.0 wt % | 50.00 wt % | 100.0 wt % |
| Total | 100.0 wt % | 100.0 wt % | 100.0 wt % | 100.0 wt % |
| Pressure at 70° F. (psia) | 219 | 220 | 216 | 221 |
| GWP | 1664 | 1240 | 2087 | 675 |
| 100% Reclaim GWP | 0 | — | — | — |
| Theoretical BP (° F.) | −59.1 | −60.2 | −58.0 | −61.6 |

*These formulas have a variation of up to ± 2%. The values were generated using the NIST REFPROP program.

FIG. 1 shows the liquid pressure (psia) versus temperature relationship of the 65:35 R-32:R-125 product compared to R-410A and R-32. As can be seen, there is a close correlation with the 65:35 R-32:R-125 product, and has a close overlap with R-410A throughout the temperature range of from −60° F. to 125° F.

Figure 2:
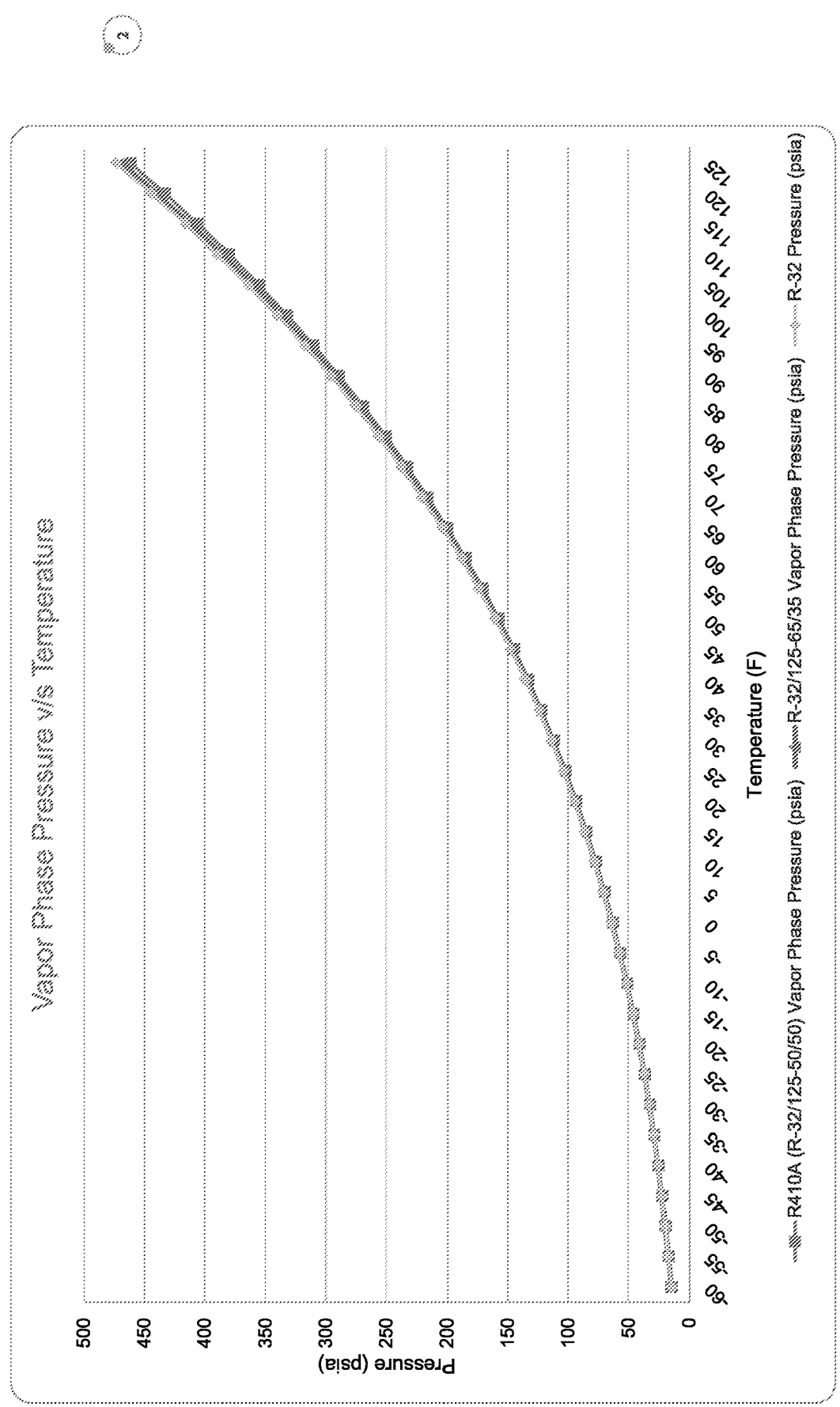
FIG. 2 depicts the vapor-phase pressure-temperature curve of the refrigerant compositions of the disclosure compared to R-410A and R-32.

FIG. 2 shows the vapor phase pressure (psia) versus temperature (° F.) relationship of 65:35 R-32:R-125 product compared to R-410A and R-32. As can be seen there is almost complete overlap over the entire temperature range from −60° F. to 125° F. with some slight divergence of about 10 psia at the top end of the temperature scale.

Figure 3:
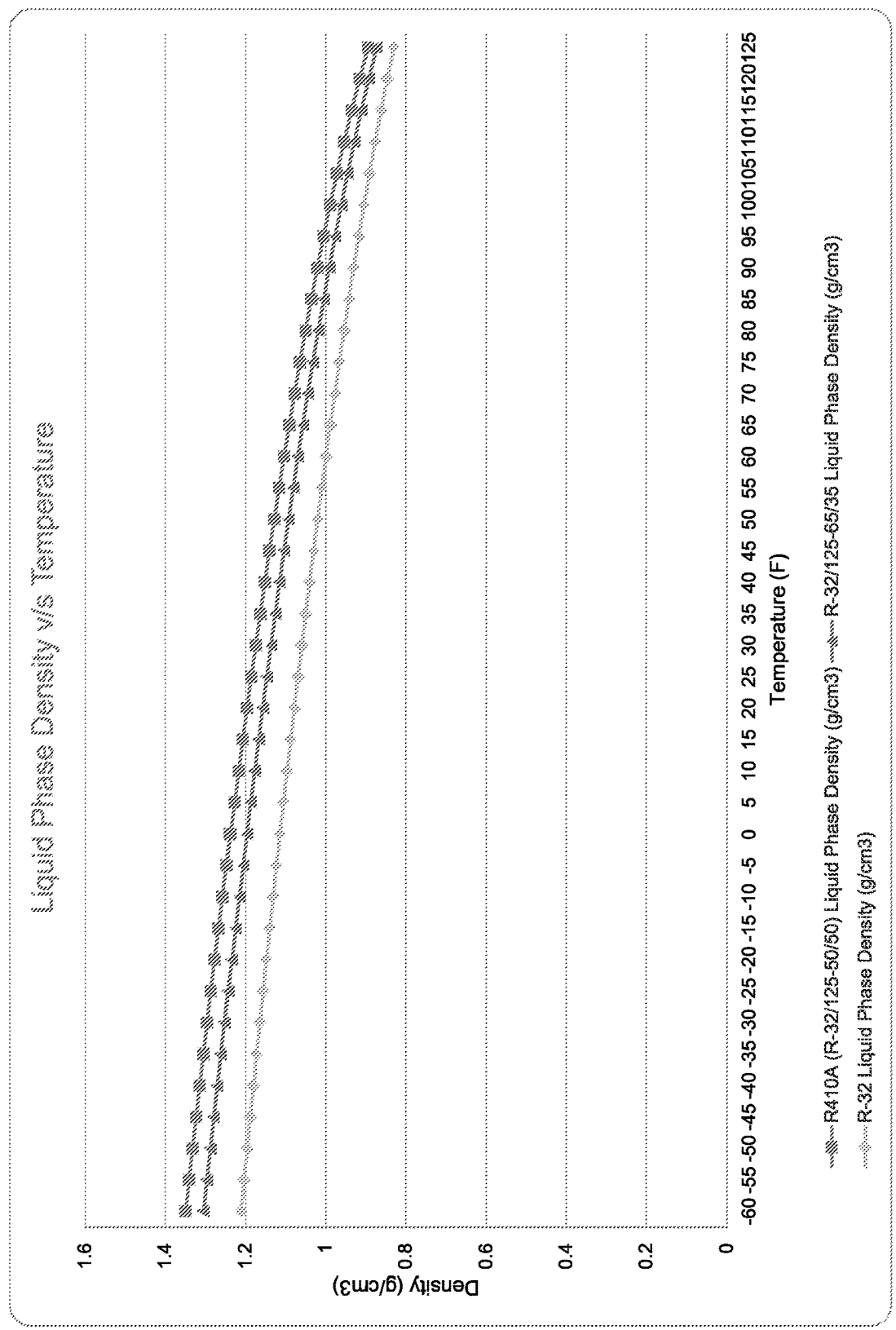
FIG. 3 depicts the liquid density-temperature curve of the refrigerant compositions of the disclosure compared to R-410A and R-32.

FIG. 3 shows the liquid phase density (g/cm³) versus temperature (° F.) of the 65:35 R-32:R-125 product compared to R-410A and R-32. There is a close correlation throughout the temperature range, with R-410A having a slightly higher density by about 0.05 g/cm³.

Figure 4:
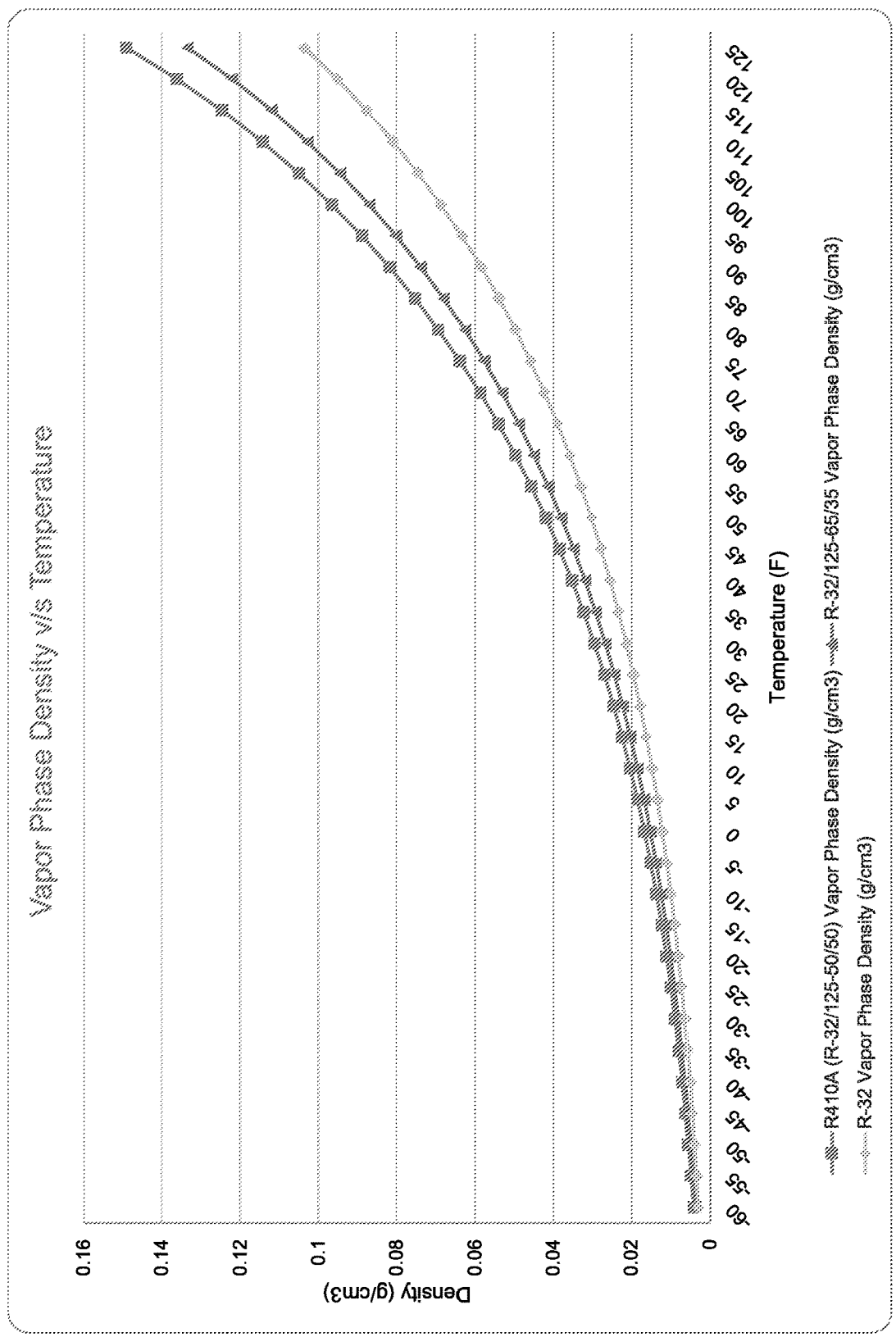
FIG. 4 depicts the vapor density-temperature curve of the refrigerant compositions of the disclosure compared to R-410A and R-32.

FIG. 4 shows the vapor phase density (g/cm³) versus temperature (° F.) of the 65:35 R-32:R-125 product compared to R-410A and R-32. There is close correlation at lower temperatures, especially those corresponding to refrigeration. At higher temperatures there is more variance with the 65:35 R-32:R-125 mixture more closely tracking the performance of R-410A. Both the 65:35 R-32:R-125 mixture and R-410A reach a vapor phase density of about 0.1 g/cm³ at 100 to 105° F. with R-32 being about 20% less with a density of 0.08 g/cm³.

Figure 5:
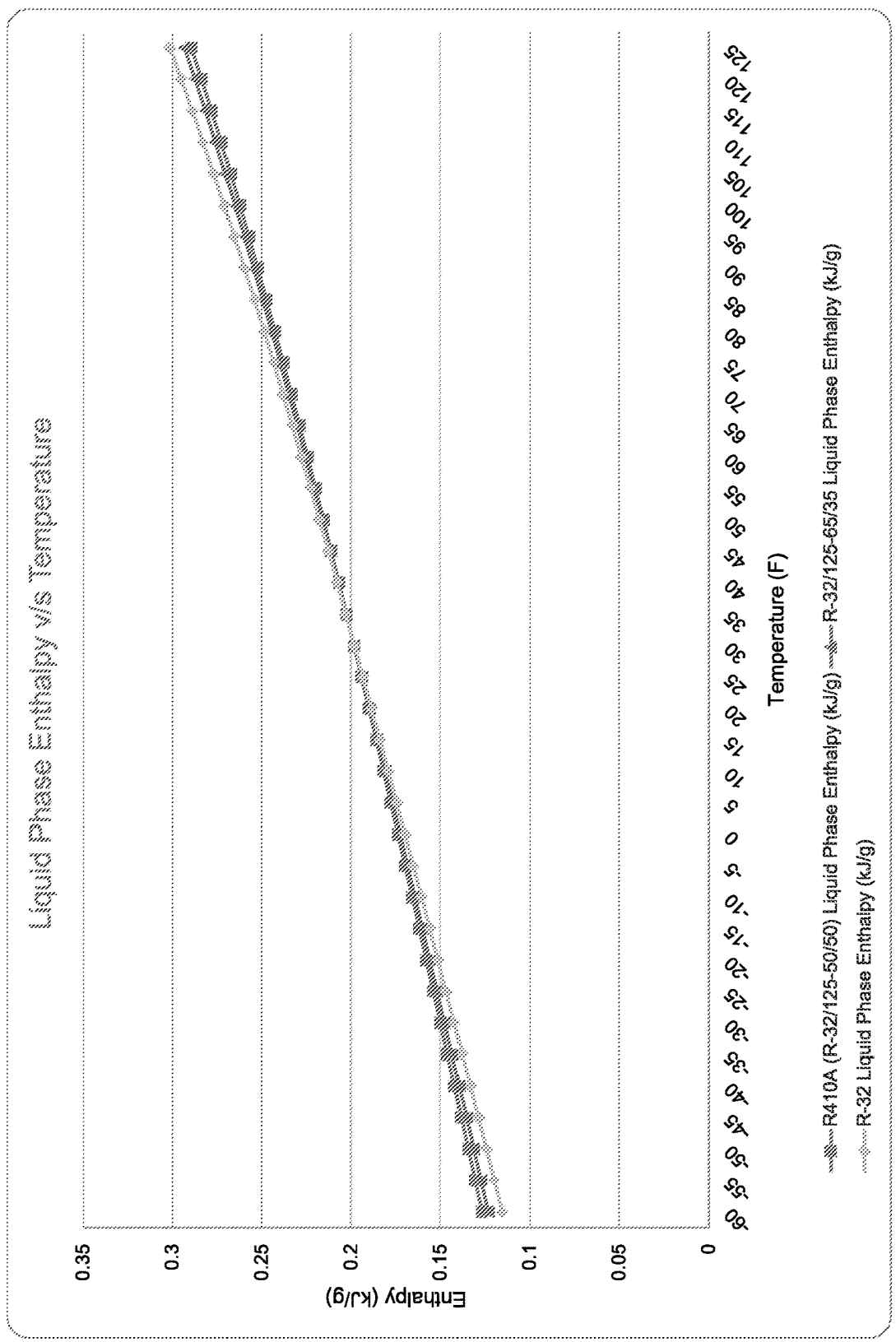
FIG. 5 depicts the liquid phase enthalpy versus temperature curve of the refrigerant compositions of the disclosure compared to R-410A and R-32.

FIG. 5 shows the liquid phase enthalpy (kJ/g) versus temperature (° F.) relationship of the 65:35 R-32:R-125 product compared to R-410A and R-32. As can be seen, there is a close correlation over the temperature range with some variance (a range of about ±0.008 kJ/g) at the ends of the range.

Figure 6:
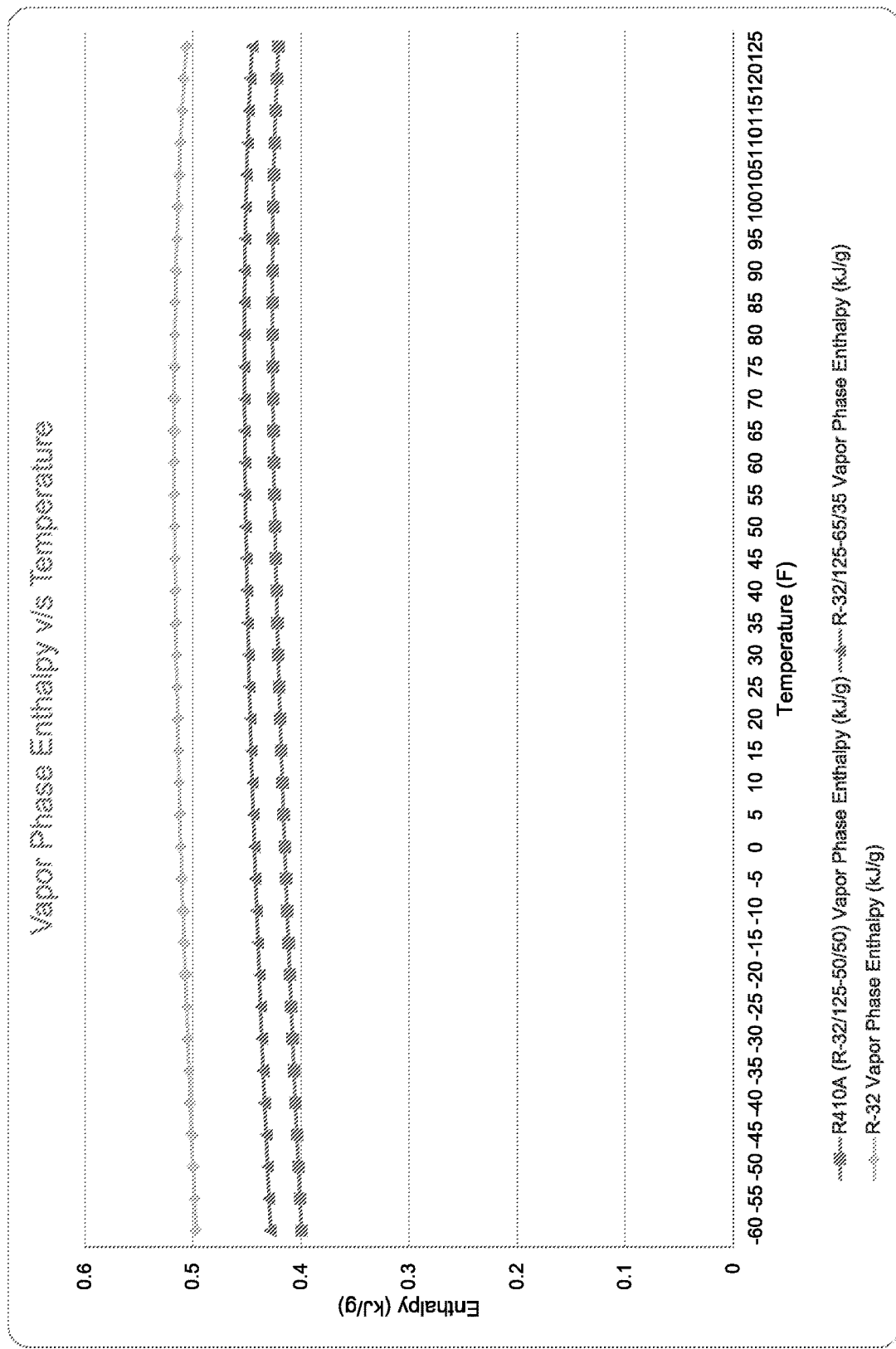
FIG. 6 depicts the vapor phase enthalpy versus temperature curve of the refrigerant compositions of the disclosure compared to R-410A and R-32.

FIG. 6 shows the vapor phase enthalpy (kJ/g) versus temperature (° F.) relationship of the 65:35 R-32:R-125 product compared to R-410A and R-32. As can be seen, there is a close correlation over the temperature range for the 65:35 R-32:R-125 product and R-410A with a variance of about ±0.03 kJ/g.

Figure 7:
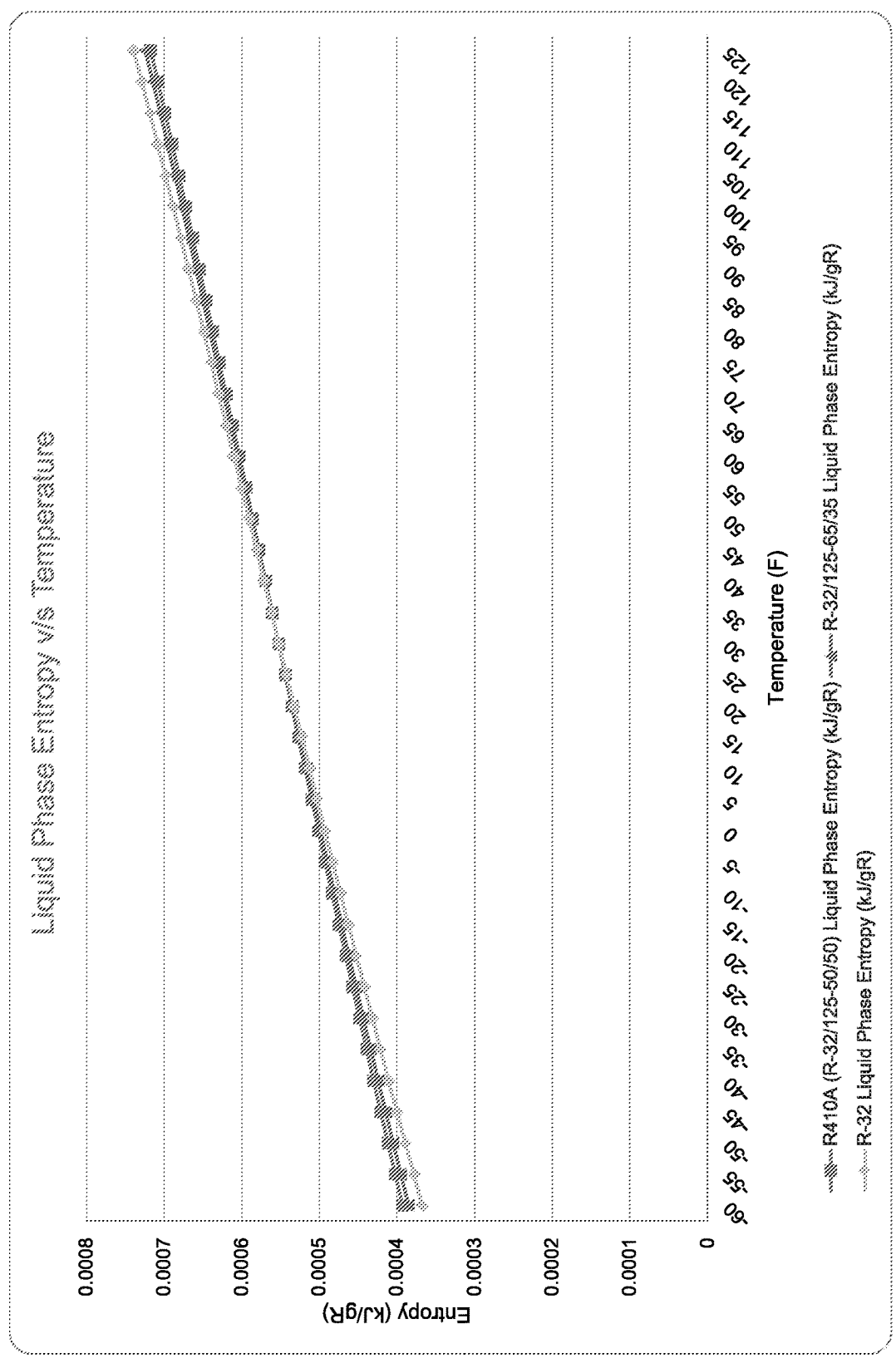
FIG. 7 depicts the liquid phase entropy versus temperature curve of the refrigerant compositions of the disclosure compared to R-410A and R-32.

FIG. 7 shows the liquid phase entropy (kJ/gR) versus temperature (° F.) relationship of the 65:35 R-32:R-125 product compared to R-410A and R-32. As can be seen, there is a close correlation over the entire temperature range with a very tight overlap in the 0° F. to 70° F. range used in air conditioning and refrigeration.

Figure 8:
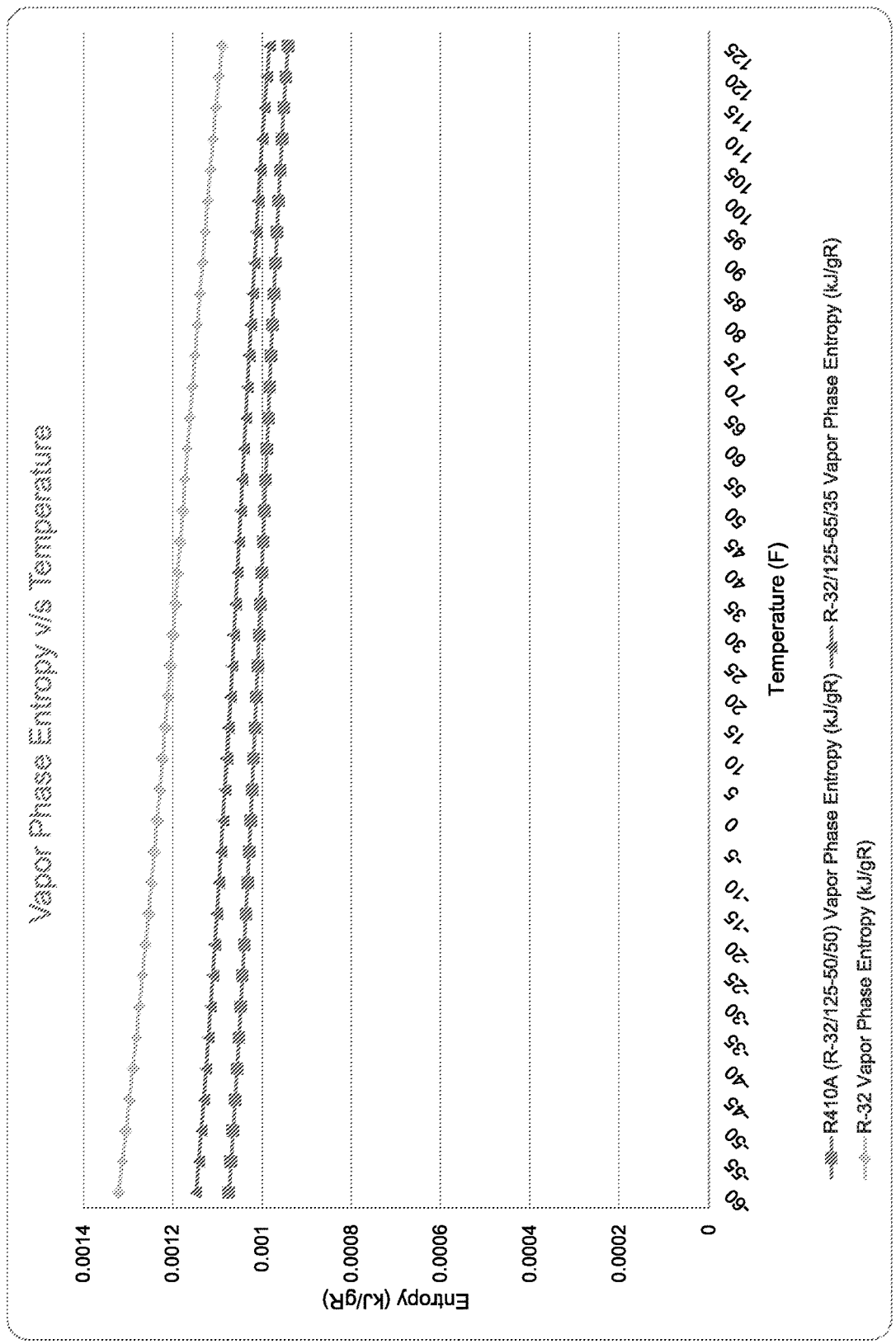
FIG. 8 depicts the vapor phase entropy versus temperature curve of the refrigerant compositions of the disclosure compared to R-410A and R-32.

FIG. 8 shows the vapor phase entropy (kJ/gR) versus temperature (° F.) relationship of the 65:35 R-35:R-125 product compared to R-410A and R-32. As can be seen, there is a close correlation between the 65:35 R-32:R-125 product and R-410A, with the 65:35 R-32:R-125 product having a slightly higher entropy.

The thermodynamic properties of the refrigerant mixtures of the disclosure at 70° F. compared to R-410A and R-32 are shown in Table 3.

TABLE 3

Thermodynamic Properties of Refrigerant Mixtures of the Disclosure Compared to R-410A and R-32 at 70° F.

| Material | Liquid Phase Pressure (psia) | Vapor Phase Pressure (psia) | Liquid Phase Density (g/cm³) | Vapor Phase Density (g/cm³) | Liquid Phase Enthalpy (kJ/g) | Vapor Phase Enthalpy (kJ/g) | Liquid Phase Entropy (kJ/gR) | Vapor Phase Entropy (kJ/gR) |
|---|---|---|---|---|---|---|---|---|
| R-32:125-60/40 | 218 | 218 | 1.055 | 0.055 | 0.234 | 0.443 | $6.2 \times 10^{-4}$ | $1.0 \times 10^{-3}$ |
| R-32:125-65/35 | 219 | 219 | 1.045 | 0.053 | 0.235 | 0.452 | $6.2 \times 10^{-4}$ | $1.0 \times 10^{-3}$ |
| R-32:125-70:30 | 220 | 220 | 1.034 | 0.051 | 0.235 | 0.461 | $6.2 \times 10^{-4}$ | $1.1 \times 10^{-3}$ |
| R-32:125-80:20 | 220 | 220 | 1.014 | 0.048 | 0.236 | 0.480 | $6.3 \times 10^{-4}$ | $1.1 \times 10^{-3}$ |
| R-32:125-90:10 | 221 | 221 | 0.995 | 0.045 | 0.237 | 0.498 | $6.3 \times 10^{-4}$ | $1.1 \times 10^{-3}$ |
| R-32 | 221 | 221 | 0.977 | 0.042 | 0.238 | 0.517 | $6.3 \times 10^{-4}$ | $1.2 \times 10^{-3}$ |
| R-410A | 216 | 216 | 1.078 | 0.059 | 0.233 | 0.426 | $6.2 \times 10^{-4}$ | $1.0 \times 10^{-3}$ |

As can be seen, the 65:35 R-32:R-125 has properties similar to R-410A and is thus an excellent drop-in replacement for R-410A.

The data in Table 3 can be compared to the properties at 0° F. shown in Table 4:

TABLE 4

Thermodynamic Properties of Refrigerant Mixtures of the Disclosure Compared to R-410A and R-32 at 0° F.

| Material | Liquid Phase Pressure (psia) | Vapor Phase Pressure (psia) | Liquid Phase Density (g/cm³) | Vapor Phase Density (g/cm³) | Liquid Phase Enthalpy (kJ/g) | Vapor Phase Enthalpy (kJ/g) | Liquid Phase Entropy (kJ/gR) | Vapor Phase Entropy (kJ/gR) |
|---|---|---|---|---|---|---|---|---|
| R-32:125-60/40 | 63.6 | 63.5 | 1.21 | 0.016 | 0.17 | 0.43 | $5.0 \times 10^{-4}$ | $1.1 \times 10^{-3}$ |
| R-32:125-65/35 | 63.8 | 63.8 | 1.20 | 0.015 | 0.17 | 0.44 | $5.0 \times 10^{-4}$ | $1.1 \times 10^{-3}$ |
| R-32:125-70:30 | 63.9 | 63.9 | 1.18 | 0.015 | 0.17 | 0.45 | $5.0 \times 10^{-4}$ | $1.1 \times 10^{-3}$ |
| R-32:125-80:20 | 64.1 | 64.1 | 1.16 | 0.014 | 0.17 | 0.47 | $5.0 \times 10^{-4}$ | $1.1 \times 10^{-3}$ |
| R-32:125-90:10 | 64.1 | 64.1 | 1.14 | 0.013 | 0.17 | 0.49 | $4.9 \times 10^{-4}$ | $1.2 \times 10^{-3}$ |
| R-32 | 64.0 | 64.0 | 1.11 | 0.012 | 0.17 | 0.51 | $4.9 \times 10^{-4}$ | $1.2 \times 10^{-3}$ |
| R-410A | 63.1 | 63.0 | 1.24 | 0.017 | 0.17 | 0.41 | $5.0 \times 10^{-4}$ | $1.0 \times 10^{-3}$ |

Here again, the 65:35 R-32:R-125 has properties similar to R-410A and is thus an excellent drop-in replacement for R-410A.

Reclamation Streams and Background

The R-32:R-125 65:35 mixture is advantageous because it can be obtained directly from a one-pass distillation of reclaimed refrigerants to yield a product having 0 net GWP. This R-32/125 65/35 mixture also has unexpectedly superior thermodynamic efficiencies as can be seen in FIGS. 9 and 10.

Figure 9:
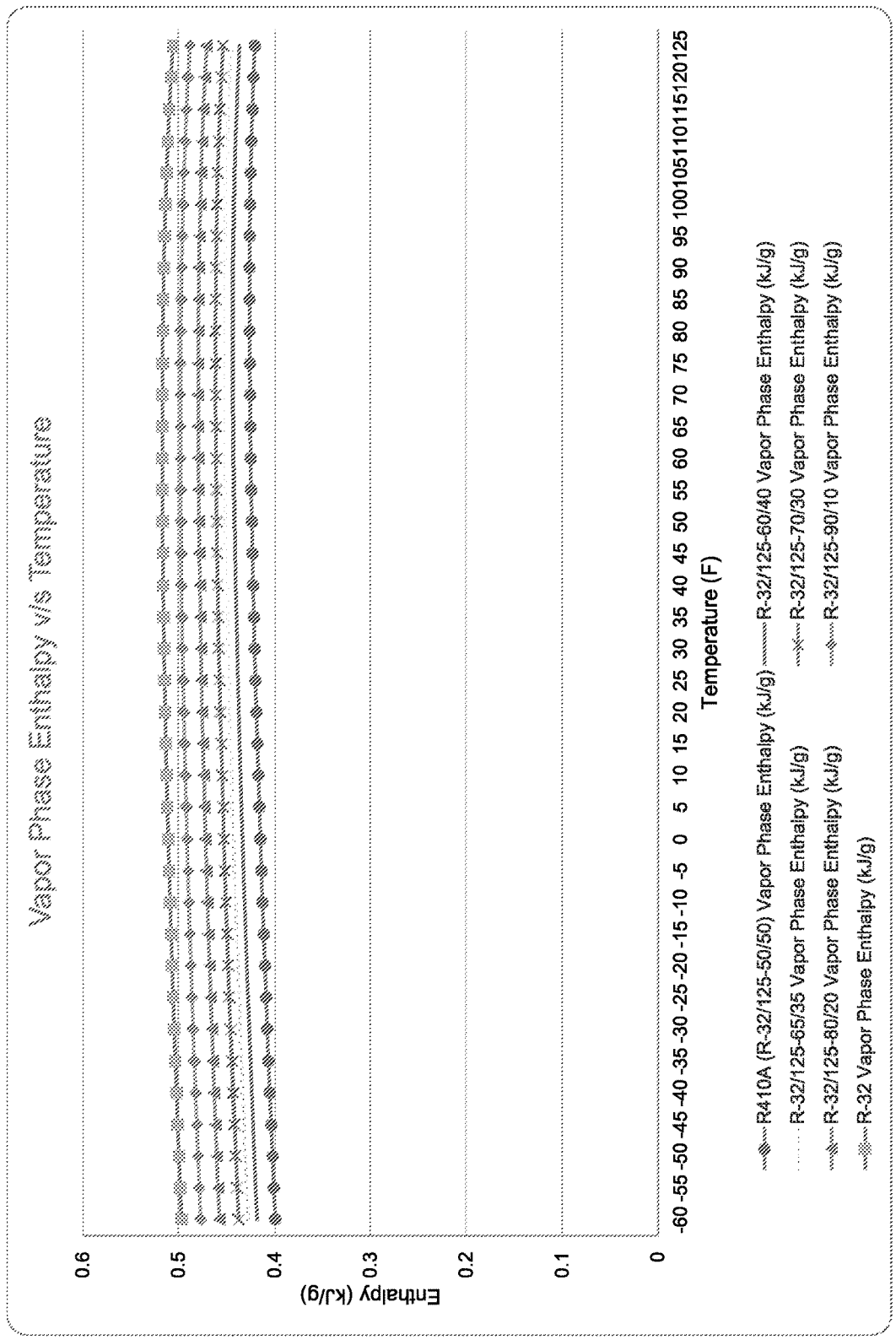
FIG. 9 depicts the vapor phase enthalpy of alternative refrigerant compositions of the disclosure compared to R-410A.

FIG. 9 is a graph showing the vapor phase enthalpy of refrigerant mixtures of the disclosure compared to R-410A. R-410A is represented by the bottommost trace with the R-32:R-125 65:35 mixture having performance very close to R-410A. The R-32:125 60:40 trace is slightly closer. However, this mixture cannot be directly obtained from a single pass distillation of reclaimed refrigerants to yield a net 0 GWP.

Figure 10:
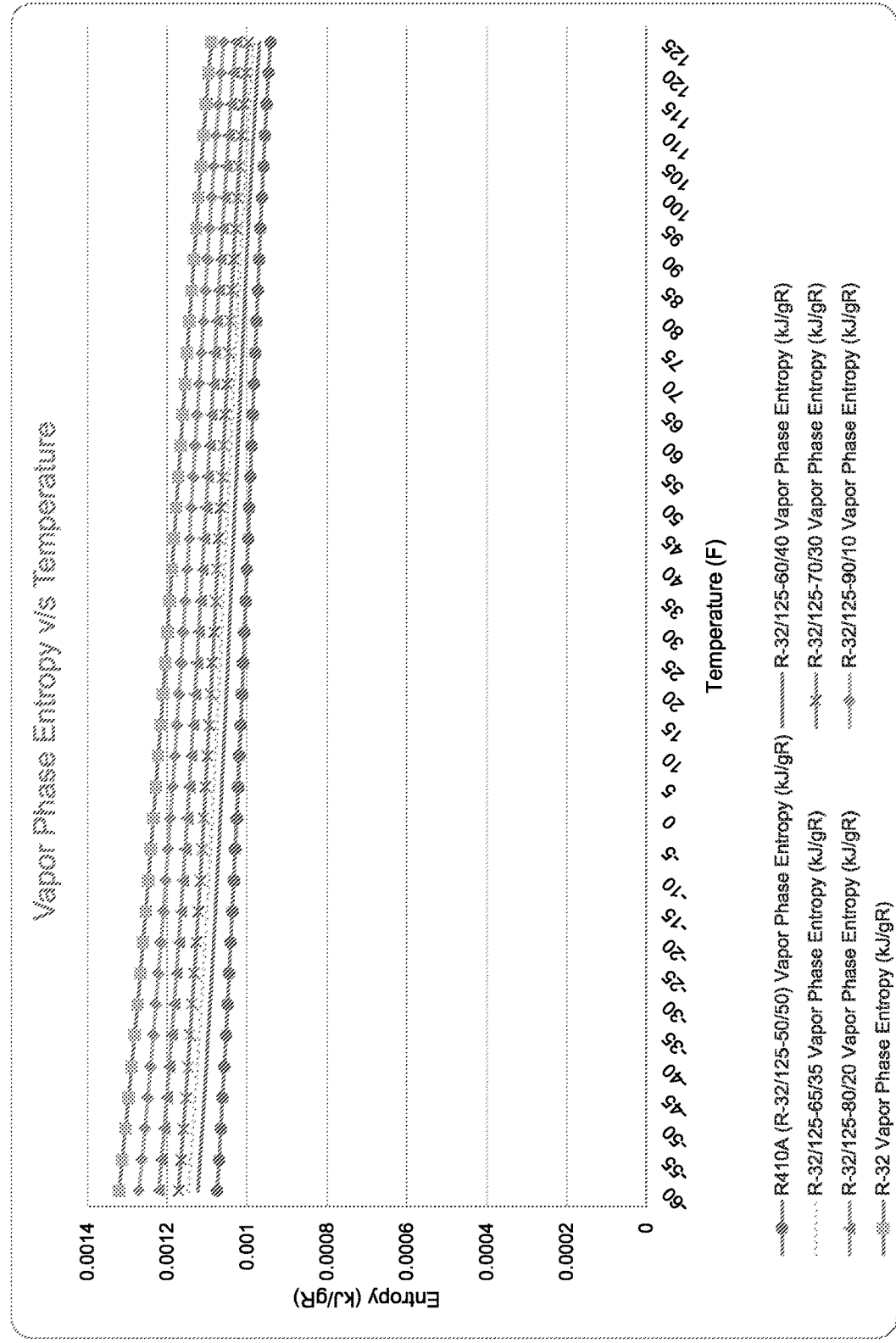
FIG. 10 depicts the vapor phase entropy of alternative refrigerant compositions of the disclosure compared to R-410A.

This performance is echoed in the graph of vapor phase entropy versus temperature shown in FIG. 10. Similarly, the R-32:R-125 65:35 mixture performs very close to R-410A. The R-32:R-125 60:40 trace is slightly closer. However, this mixture cannot be directly obtained from a single pass distillation of reclaimed refrigerants to yield a net 0 GWP. Also, the lower entropy in the vapor phase means that the phase transition required for refrigeration is more efficient. Accordingly, the R-32:R-125 65:35 mixture will consume less energy than many of the possible alternative formulations.

Reclamation Streams and Background

FIG. 11 and FIG. 11A is a reclamation summary of data by the U.S. EPA for the reclamation history of ODS (ozone-depleting substances) as well as HFCs. One can observe the category of the growing quantities of HFCs that are classified as "mixed", which includes R –410A. These highly mixed HFCs, that can also contain ODS streams, are a growing environmental category of carbon pollution with no known uses. The virgin manufactured solutions that are formulated HFC/HFO blends have lower GWP and will continue to grow the mixed category or will be vented into the atmosphere at the end of life without appropriate technology for recycling and decarbonization. In contrast, the formulations of the disclosure have zero net GWP and thus eliminate the environmental burden caused by virgin formulations, even if these virgin formulations have a lower relative GWP.

Figure 12:
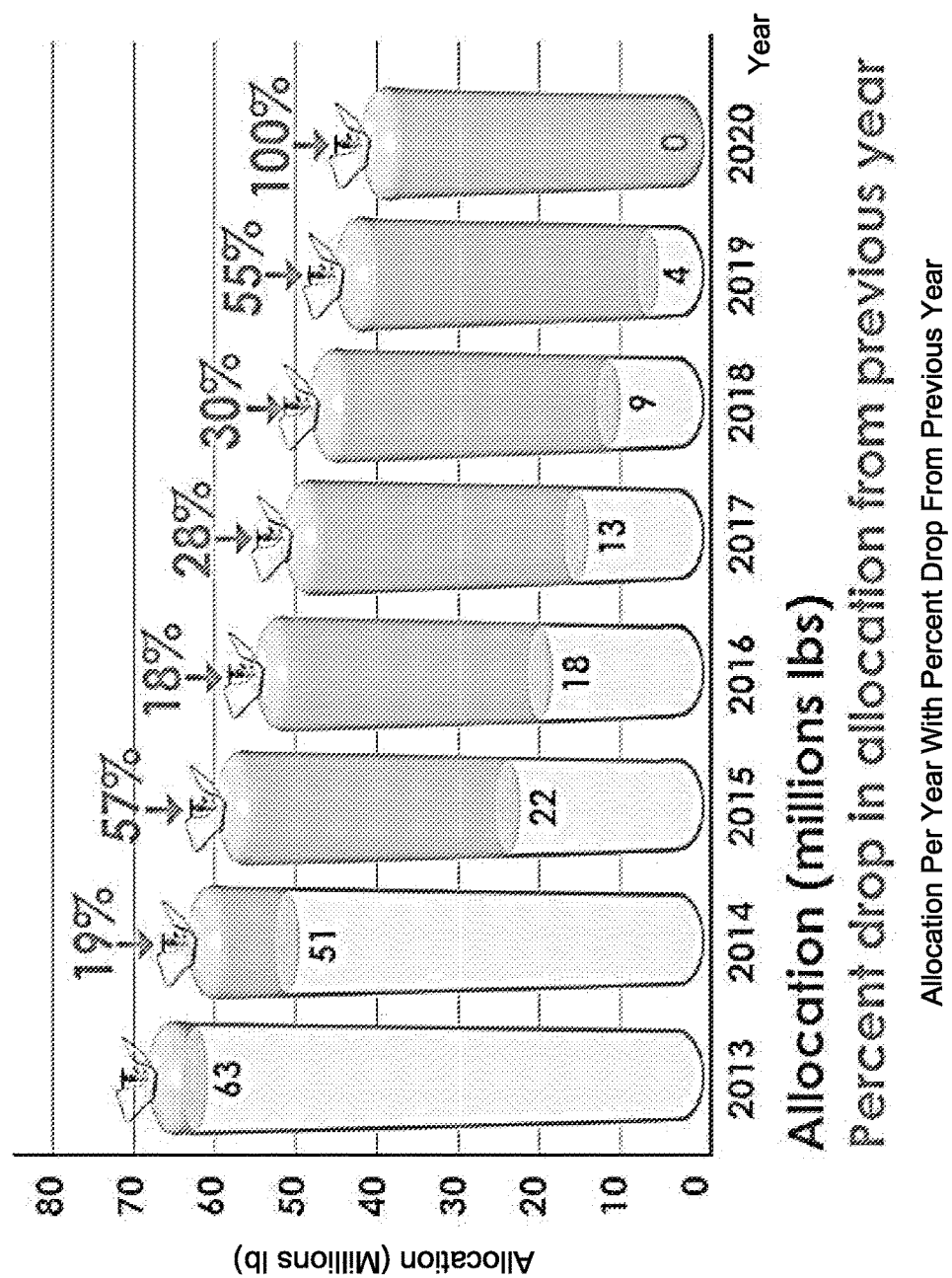
FIG. 12 depicts the R-22 phase-out schedule.

Although ODS (R-22) was phased out on the schedule shown in FIG. 12, with an allocation of 0 pounds scheduled for 2020, R-22 is still the largest reclaimed product in the U.S. and based on history, will take many years to completely phase out. R-22 is a single molecule and much easier to reclaim with single plate distillation than complex HFCs. HFC blends and mixed HFCs require a much more complicated technology in order to reprocess.

Figure 13:
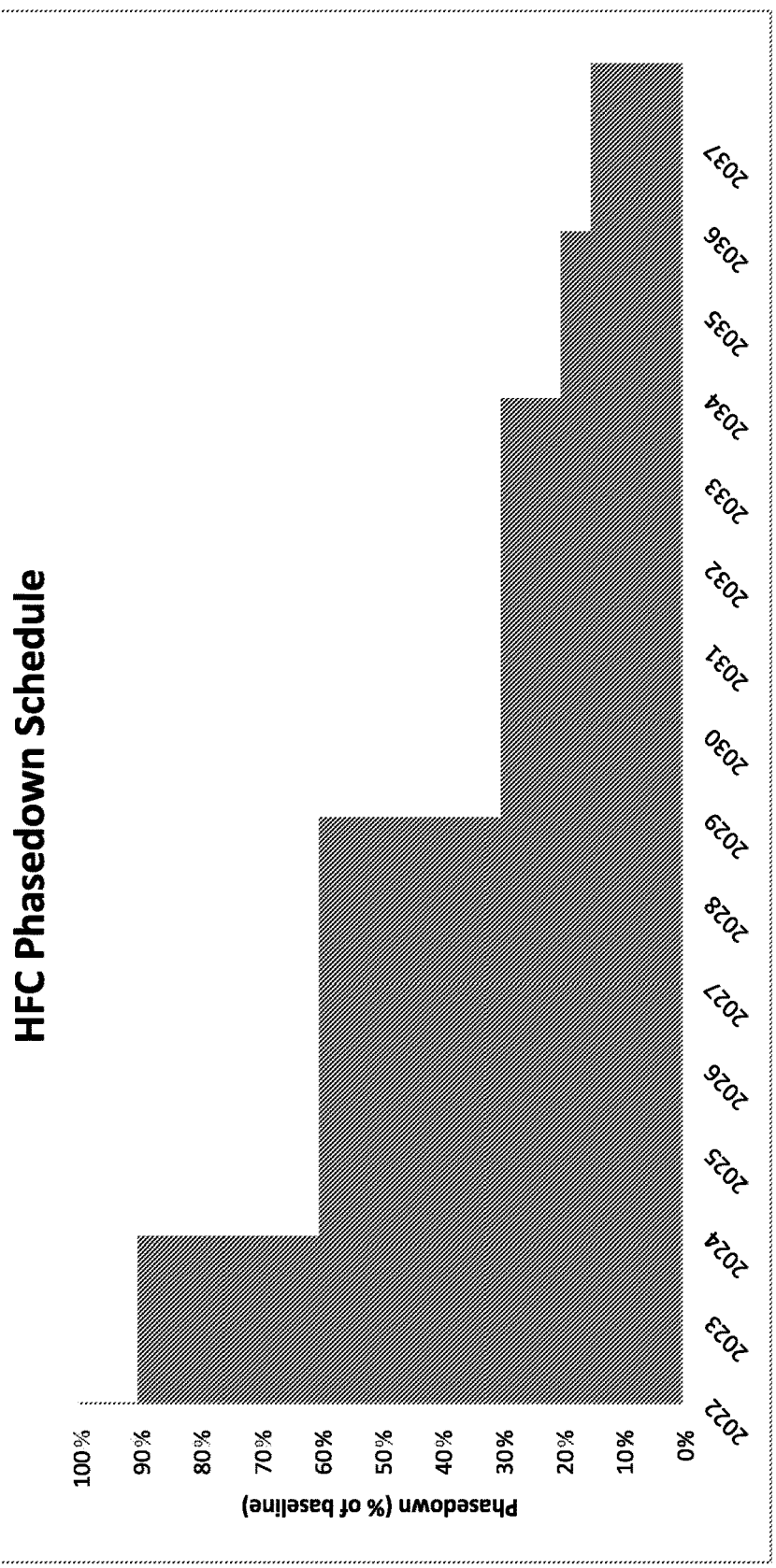
FIG. 13 depicts the HFC phasedown schedule.

FIG. 13 depicts the AIM ACT HFC phasedown schedule from 2022 to 2037. Over this time frame, the phasedown goes from a 90% reduction in 2022 down to 15% in 2037.

Components of the refrigerant formulation of the disclosure contain reclaimed material. The EPA defines refrigerant reclamation as a means to reprocess refrigerant to at least the purity specified in Appendix A of 40 C.F.R. § 82, subpart F (based on AHRI Standard 700-1993, Specifications for Fluorocarbon and Other Refrigerants) and to verify this purity using the analytical methodology prescribed in appendix A. The EPA requires that refrigerant be reclaimed when a certified technician recovers refrigerant and puts it in a special DOT container and has no intention of putting it back in the same system from which it was recovered.

In the disclosure, the refrigerant must be reclaimed to the AHRI Standard 700 of purity by a certified reclaimer. This requirement protects the integrity of used refrigerant to prevent damage to air-conditioning and refrigeration equipment. Contaminated refrigerants can lead to increased repair costs, shortened maintenance intervals, decreased equipment lifespan, increased leak rates, and a reduction in consumer confidence in reclaimed refrigerants. Once the reclaimed refrigerant is brought up to standard, it can be used at least partially or wholly in the formulations of the disclosure.

Formulations with reclaimed material results in a dramatic reduction in GWP, because the reclaimed material is not being released into the atmosphere. Formulations with all reclaimed material results in a net GWP of about 0 and reduces the requirement to run virgin HFC/HFO plants in various parts of the world.

Another issue for refrigerants is flammability. The most well-established classification for this is the ASHRAE classification. Refrigerants such as R-410A, R-407A and R-404A are class 1 in their flammability, so do not show flame propagation when tested at 100° C. and 101.3 kPa in air. Class 2 refrigerants are those with flammability lower than 0.10 kg/m$^3$ at 100° C. and 101.3 kPa and a heat of combustion of less than 19 kJ/kg. Class 3 refrigerants have flammability over this boundary and this includes many hydrocarbons.

In response to the global HFC phasedown, many of the largest air conditioning equipment manufacturers have redesigned their air conditioning equipment to utilize R-32 because of its lower GWP rating of 677. R-32 is a high-pressure, mildly flammable refrigerant (A2L). In 2029, the AIM Act will reduce HFC production and imports to 30% of baseline (70% reduction), and the market will require a supply of reclaimed R-410A to make up for the shortfall needed to service the installed equipment base. Reclaimed R-410A has a net-zero GWP since regulatory agencies previously accounted for its GWP value at the time of initial production or importation and it is unnecessary to run additional R-125 plants in China, India, the UAE or globally to make more product that is abundantly available for blending into R-410A in the U.S. without contributing to additional climate change.

R-410A is used primarily in home cooling applications like multi-family living and impacts nearly every person in the United States. There are 3 classifications of flammability in AHRI with R32 receiving a "mildly" flammable application compared to the A1 "non-flammable" category of R-410A (combination of R-32 and R-125). The disclosed formulation will be a direct drop in for R410a in existing applications as well as make up gas at lower flammability considerations.

Lubricants

Optionally, lubricants can be added to the formulations of the disclosure. The lubricants can be mineral oil, alkylbenzene oil or polyol ester (POE).

In another embodiment, the POE can be a synthetic POE compatible for use in refrigeration and air-conditioning compressors using HFC refrigerants, as well as for original equipment manufacturing (OEM) retrofitting operations.

The POE forms a single clear phase, i.e., is miscible with the formulations of the disclosure. Miscibility lowers the viscosity of the lubricant carried through the system, so that the lubricant can more efficiently return to the compressor. In contrast, existing mineral oil lubricants are not miscible with HFCs. The composition of the present disclosure is compatible with all types of compressors, including reciprocating and rotary in residential air conditioning, and centrifugal, reciprocating and scroll in industrial and commercial refrigeration and air conditioning.

The POE of the present disclosure can be obtained by introducing neopentyl polyol material, aliphatic monocarboxylic acid material and a catalytic quantity of acid catalyst material into a reaction zone, whereby a reaction mixture is formed, the neopentyl polyol material being at least one neopentyl polyol represented by the structural formula:

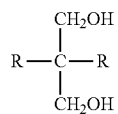

in which each R is independently selected from —CH$_3$, —C$_2$H$_5$ and —CH$_2$OH. The aliphatic monocarboxylic acid material is at least one aliphatic hydrocarbon monocarboxylic acid, and the acid catalyst material is at least one acid esterification catalyst, wherein the initial concentration of the aliphatic monocarboxylic acid material in the reaction mixture is such as to provide an initial mole ratio of carboxyl groups to hydroxyl groups in the reaction mixture of from about 0.25:1 to about 0.5:1, and, while the reaction mixture is established and maintained at about 338-392° F. (170-200° C.), aliphatic monocarboxylic acid vapor and water vapor are withdrawn from the reaction zone.

Another approach would be to produce a poly(neopentyl polyol) ester composition by (i) reacting a neopentyl polyol having the formula:

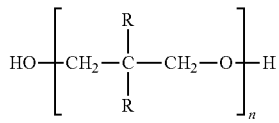

wherein each R is independently selected from CH$_3$, C$_2$H$_5$ and CH$_2$OH and n is a number from 1 to 4, with at least one monocarboxylic acid having 2 to 15 carbon atoms in the presence of an acid catalyst and at an initial mole ratio of carboxyl groups to hydroxyl groups of greater than 0.5:1 to 0.95:1 to form a partially esterified poly(neopentyl polyol) composition; and (ii) reacting the partially esterified poly(neopentyl polyol) composition produced in (i) with additional monocarboxylic acid having 2 to 15 Carbon atoms to form a final poly(neopentyl polyol) ester composition.

The properties of the POE of the present disclosure can be in the viscosity range of about 20 to 68 cSt at 40° C. (104° F.) and about 3 to 7 cSt at 100° C. (212° F.). The viscosity index should be in the range of about 100 to 130. The pour point should be in the range of about −40 to −50° C. (−40 to −58° F.). The density at 20° C. (68° F.) should be in the range of about 0.97 to 0.98 g/ml. The flash point should be in the range of about 240 to 270° C. (about 464 to 518° F.). The acid value should be less than about 0.05 mg KOH/g.

The disclosure is not restricted to POE lubricant. Other lubricants can include mineral or hydrocarbon oil, alkylbenzene oil, white or paraffinic oil and mixtures thereof. The amount of lubricating oil is an amount effective in providing acceptable lubrication to the compressor parts for its longevity. An effective amount of these conventional lubricating oils is the amount recommended by the equipment manufacturer. Typically, the conventional lubricating oil is present in an amount from about 1 to about 60 wt %. The present disclosure has unexpectedly found the amount of POE to be less than about 1 wt %, as little as about 0.67 wt %, with even 0.4 wt % giving excellent lubrication. The range in which POE can be present can be from about 0.1 to about 5 wt %.

Additives

The compositions of the disclosure may also contain one or more additives such as oxidation resistance and thermal stability enhancers, corrosion inhibitors, metal deactivators, lubricity additives, viscosity index enhancers, pour and/or floc point depressants, detergents, dispersants, antifoaming agents, anti-wear agents, UV dyes, sealants and extreme pressure resistant additives. Many additives are multifunctional. For example, certain additives may impart both anti-wear and extreme pressure resistance properties, or function both as a metal deactivator and a corrosion inhibitor. Cumulatively, all additives preferably do not exceed about 8 wt %, or more preferably do not exceed about 5 wt %, of the total composition.

An effective amount of the foregoing additive types is generally in the range from about 0.01 to 5 wt % for the antioxidant component, about 0.01 to 5 wt % for the corrosion inhibitor component, from about 0.001 to 0.5 wt % for the metal deactivator component, from about 0.5 to 5 wt % for the lubricity additives, from about 0.01 to 2 wt % for each of the viscosity index enhancers and pour and/or floc point depressants, from about 0.1 to 5 wt % for each of the detergents and dispersants, from about 0.001 to 0.1 wt % for antifoam agents, and from about 0.1-2 wt % for each of the anti-wear and extreme pressure resistance components. All these percentages are by weight and are based on the total composition. It is to be understood that more or less than the stated amounts of additives may be more suitable to particular circumstances, and that a single molecular type or a mixture of types may be used for each type of additive component. Also, the examples listed below are intended to be merely illustrative and not limiting.

Examples of oxidation resistance and thermal stability enhancers suitable for use in the present disclosure include, for example: diphenyl-, dinaphthyl-, and phenylnaphthyl-amines, in which the phenyl and naphthyl groups can be substituted, e.g., N,N'-diphenyl phenylenediamine, p-octyl-diphenylamine, p,p-dioctyldiphenylamine, N-phenyl-1-naphthylamine, N-phenyl-2-naphthylamine, N-(p-dodecyl) phenyl-2-naphthylamine, di-1-naphthylamine, and di-2-naphthylamine; phenothiazines such as N-alkyl-phenothiazines; imino(bisbenzyl); hindered phenols such as 6-(t-butyl) phenol, 2,6-di-(t-butyl) phenol, 4-methyl-2,6-di-(t-butyl) phenol, 4,4'-methylenebis (2,6-di-{t-butyl} phenol); combinations of two or more thereof, and the like.

Examples of cuprous metal deactivators suitable for use in the present disclosure include: imidazole, benzimidazole, 2-mercaptobenzothiazole, 2,5-dimercaptothiadiazole, salicylidine-propylenediamine, pyrazole, benzotriazole, tolutri-azole, 2-methylbenzimidazole, 3,5-dimethyl pyrazole, and methylene bis-benzotriazole. Benzotriazole derivatives are preferred. Other examples of more general metal deactivators and/or corrosion inhibitors include organic acids and their esters, metal salts, and anhydrides, e.g., N-oleyl-sarcosine, sorbitan mono-oleate, lead naphthenate, dodecenyl-succinic acid and its partial esters and amides, and 4-nonylphenoxy acetic acid; primary, secondary, and tertiary aliphatic and cycloaliphatic amines and amine salts of organic and inorganic acids, e.g., oil-soluble alkyl ammonium carboxylates; heterocyclic nitrogen containing compounds, e.g., thiadiazoles, substituted imidazolines, and oxazolines; quinolines, quinones, and anthraquinones; propyl gallate; barium dinonyl naphthalene sulfonate; ester and amide derivatives of alkenyl succinic anhydrides or acids, dithiocarbamates, dithiophosphates; amine salts of alkyl acid phosphates and their derivatives.

Examples of suitable lubricity additives include long chain derivatives of fatty acids and natural oils, such as esters, amines, amides, imidazolines, and borates.

Examples of suitable viscosity index enhancers include polyacrylates, polymethacrylates, copolymers of vinyl pyrrolidone, as well as, acrylates, methacrylates, polybutenes, and styrene-acrylate copolymers.

Examples of suitable pour point and/or floc point depressants include polymethacrylates such as methacrylate-ethylene-vinyl acetate terpolymers; alkylated naphthalene derivatives; and products of Friedel-Crafts catalyzed condensation of urea with naphthalene or phenols.

Examples of suitable detergents and/or dispersants include poly butenyl succinic acid amides; polybutenyl phosphonic acid derivatives; long chain alkyl substituted aromatic sulfonic acids and their salts; and metal salts of alkyl sulfides, of alkyl phenols, and of condensation products of alkyl phenols and aldehydes.

Examples of suitable antifoam agents include silicone polymers and acrylates.

Examples of suitable anti-wear and extreme pressure resistance agents include sulfurized fatty acids and fatty acid esters, such as sulfurized octyl tallate; sulfurized terpenes; sulfurized olefins; organopolysulfides; organophosphorus derivatives including amine phosphates, alkyl acid phosphates, dialkyl phosphates, anime dithiophosphates, trialkyl and triaryl phosphorothioates, trialkyl and triaryl phosphines, and dialkylphosphites, e.g., amine salts of phosphoric acid monoethyl ester, amine salts of dinonylnaphthalene sulfonate, triphenyl phosphate, trinaphthyl phosphate, diphenyl cresyl and cresyl diphenyl phosphates, naphthyl diphenyl phosphate, triphenyl phosphorothionate; dithiocarbamates, such as an antimony dialkyl dithiocarbamate; chlorinated and/or fluorinated hydrocarbons, and xanthates.

Fluorescent dyes may be added to the refrigerant mixture in order to detect leaks. One preferred leak detection or dye additive is a fluorescent, alkyl substituted perylene dye compound, dissolved in an oil which is the same as the system lubricating oil, or which is otherwise compatible with the refrigerant and oil. The dye may be soluble in polyhalogenated hydrocarbon refrigerants and fluoresces a brilliant yellow-green under illumination by long wave ultraviolet light. In an automobile air conditioner system that has a fully-charged capacity of thirty-three ounces of R-134A refrigerant and seven ounces of lubricating oil, an amount of about 0.014 ounces dye additive is effective to locate leaks without adversely affecting the operation of the system.

In an embodiment, the dye is a fluorescent dye which is a solid compound or composition soluble in both the refrigerant and refrigeration or system lubricant. The dyes could be naphthoxanthene, perylene and naphthalene compounds, such as:

naphtho{3,2,I-kl}xanthene-2,8-dialkyl,
naphtho{3,2,I-kl}xanthene-2,8-dimethyl,
3,9-perylene dialkyl acetate,
3,9-perylene dimethyl acetate,
4-alkylamino-n-alkyl-naphthalimide,
4-alkylamino-n-methyl-naphthalimide, and
dinaphtho(I,2,3-cd; 1'2'3-Im)perylene-9,18-dione, alkyl derivatives.

Dye concentrates can be used which includes a lubricant and at least about 3 weight percent of a leak detection dye, wherein the dye concentrate is a suspension or a semi-solid material, the dye concentrate has a viscosity of at least 10 cP at room temperature, the leak detection dye includes a naphthalimide, a perylene, a thioxanthene, a coumarin, or a fluorescein, and the leak detection dye includes a plurality of particles in which greater than 60 percent of the particles have a particle size of less than 40 microns.

Similar to the liquid dyes, the fluorescent solid dye must be stable at operating temperatures of the A/C or refrigeration system, and should not change the properties of the refrigerant or the system lubricant or adversely affect components and parts of the system.

Sealants may also be added to the refrigerant mixture in order to seal leaks of refrigerant. Leaks allow refrigerants and other working fluids to escape into the atmosphere, contaminating the environment and decreasing the efficiency and cooling capacity of the unit. If large amounts of cooling working fluids such as refrigerants escape, the system may overheat and the service life of the unit will thereby be shortened. Further, the unit may suffer mechanical failure from the loss of the working fluid. In general, leaks in heating and cooling systems also decrease the heat transfer efficiency of these systems.

One example of a sealant is a composition of about 60% by volume of vinyltrimethoxysilane, about 30% by volume of n-beta(aminoethyl)-gamma-aminopropyltrimethoxysilane; and about 10% by volume of methyltrimethoxysilane, a water scavenger. The methyltriethoxysilane is a water scavenger and the vinyl trimethylsilane is a metal bonding material in which the n-beta-(aminoethyl)-gamma-aminopropyltrimethoxysilane is for cross linking.

An organosilane or components of the sealant mixture may include components that can be represented as $(R_1)(R_2)Si(R_3)(R_4)$ where, $R_1$ is an alkyl radical of 1-4 carbon atoms or vinyl or —OH, $R_2$ is $R_1$ or —$OR_1$ or —$NH(R_1)$ or —$N(R_1)_2$ or —$R_1NHR_1NH_2$, $R_3$ is $R_1$ or —$OR_1$ or —$NH(R_1)$ or —$N(R_1)_2$ or —$R_1NHR_1NH_2$, and $R_4$ is $R_1$ or —$OR_1$ or —$NH(R_1)$ or —$N(R_1)_2$ or —$R_1NHR_1NH_2$.

A component of the sealant mixture may include components that can be represented as $(R_5)(R_6)(R_7)Si$—$O$—$Si(R_5)(R_6)(R_7)$ $R_5$, $R_6$ or $R_7$ are each any one of $R_1$, $R_2$, $R_3$ or $R_4$ where, $R_1$ is any alkyl radical of 1-4 carbon atoms or vinyl or —OH, $R_2$ is $R_1$ or —$OR_1$ or —$NH(R_1)$ or —$N(R_1)_2$ or —$R_1NHR_1NH_2$, $R_3$ is $R_1$ or —$OR_1$ or —$NH(R_1)$ or —$N(R_1)_2$ or —$R_1NHR_1NH_2$, and $R_4$ is $R_1$ or —$OR_1$ or —$NH(R_1)$ or —$N(R_1)_2$ or —$R_1NHRR_1NH_2$.

Other components which can be included are oligomers of the monomeric silanes described. One such example are the siloxanes: $(R_5)(R_6)(R_7)Si$—$O$—$Si(R_5)(R_6)(R_7)$ Where $R_5$, $R_6$ or $R_7$ may be $R_1, R_2, R_3$ or $R_4$.

The sealant mixture may also include a lubricant miscible with the organosilane and refrigerant for use in the system. The miscible mixture may include a lubricant selected from one or more of a polyol ester, polyalkylene glycol, mineral oil, polyalphaolefin and alkylbenzene. The miscible mixture may include a lubricant further formed from additives to enhance and refresh the performance of the lubricant in the compressor.

The organosilane is chosen with several criteria in mind. The organosilane is miscible in the lubricant fluid; it is typically a monomer, but may contain oligomers capable of forming a solid polymer with itself or other chosen organosilanes in the presence of moisture under the conditions of the particular application. The reaction rate of the organosilane or mixture of organosilanes is sufficient to form an effective seal at the site of the leak. The polymeric seal is chosen to be sufficiently strong to maintain an effective barrier to prevent further leakage of refrigerant from the system. Also, the organosilanes are chosen to be stable in the absence of moisture, be non-corrosive and otherwise inactive to the components of the system and be generally environmentally acceptable. Further, the nature and quantity injected of the organosilanes are chosen, to the extent that it would interfere with the refrigerant and/or lubricant, so that such interference remains consistent with the normal operation of the refrigerant fluid, e.g., vaporization and liquefaction characteristics.

An effective amount of the foregoing additive types is generally in the range from about 0.01 to about 5 wt % for the antioxidant component, about 0.01 to about 5 wt % for the corrosion inhibitor component, from about 0.001 to about 0.5 wt % for the metal deactivator component, from about 0.5 to about 5 wt % for the lubricity additives, from about 0.01 to about 2 wt % for each of the viscosity index enhancers and pour and/or floc point depressants, from about 0.1 to about 5 wt % for each of the detergents and dispersants, from about 0.001 to about 0.1 wt % for antifoam agents, and from about 0.1 to about 2 wt % for each of the anti-wear and extreme pressure resistance components. All these percentages are by weight and are based on the total composition. It is to be understood that more or less than the stated amounts of additives may be more suitable to particular circumstances, and that a single molecular type or a mixture of types may be used for each type of additive component. As used herein, the term "effective amount" means the amount of each component which upon combination with the other component or components, results in the formation of the present compositions.

Many of the aforementioned additives are multifunctional. For example, certain additives may impart both anti-wear and extreme pressure resistance properties, or function both as a metal deactivator and a corrosion inhibitor. Cumulatively, all additives preferably do not exceed about 8% by weight, or more preferably do not exceed about 5% by weight, of the total composition.

Government Mandates and Regrigerant Deduction

FIGS. 11 and 11A are a reclamation summary of data by the U.S. EPA for reclamation data of ODS (ozone-depleting substances) as well as HFCs. In addition, you can see the category of the growing quantities of HFCs that are classified as "mixed". This is a growing environmental category with no known uses. In looking at all of the data, a few thoughts can be clearly seen:

Although ODS (R-22) was phased out on the schedule shown in FIG. 12, R-22 is still the largest reclaimed product in the U.S. and based on history, will take many years to completely phase out. R-22 is a single molecule and much easier to reclaim with single plate distillation than complex HFCs.

As shown in FIG. 11A, in 2020, 2.4 MM pounds of R410A of the total sold into the market were reclaimed.

The most difficult stream that exists is the category of "mixed" refrigerant that as the EPA explains is a combination of ODS (R-22) and various HFC streams that cannot be reprocessed and represents nearly 1 million pounds per year, but it is being stockpiled because of complexity.

From a mass balance perspective, it is clear from all data presented that reclamation of refrigerants is severely lacking with the majority of refrigerants vented back into the atmosphere and contributing to global warming.

The manufacturers of next-generation HFC/HFO blends do not participate in reclaim and focus on selling virgin materials back into the market at lower GWP without lifecycle management of the refrigerants that have already been sold.

Manafacture and Use

The refrigerant composition of the present disclosure can be used as an original OEM refrigerant or as a drop-in replacement for equipment using R-410A.

Figure 14:
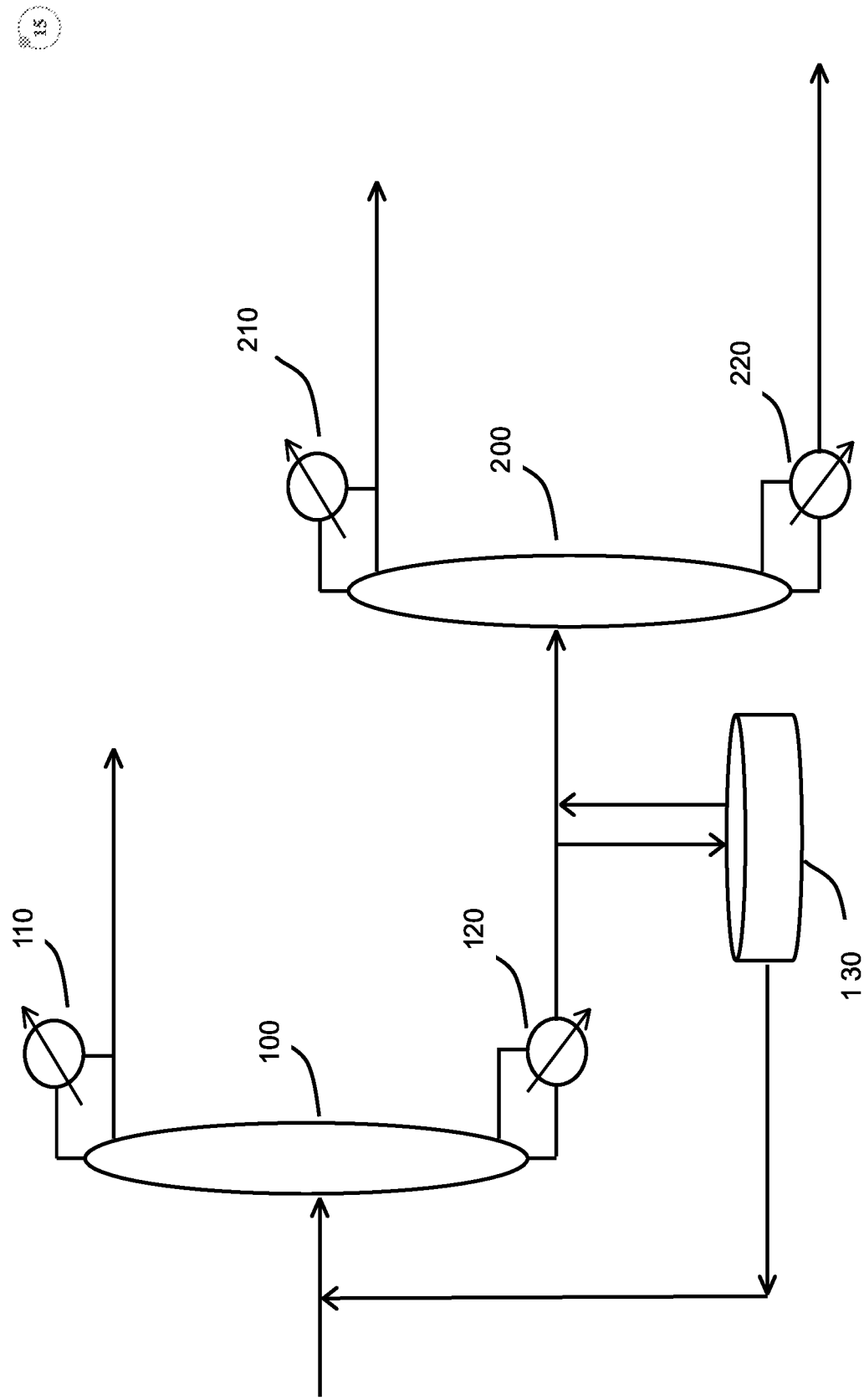
FIG. 14 is a schematic diagram of a distillation apparatus according to an embodiment of the disclosure.

FIG. 14 is a schematic diagram of a distillation apparatus configured to produce an R-32:R-125 mixture that can be utilized as a 0 net GWP replacement for R-410A.

In FIG. 14, a reclaimed refrigerant mixture is injected into the center of a distillation column 100 equipped with a reflux condenser 110 and a reboiler 120. The column 100 is packed with a material, such as steel Pall rings, configured to provide sufficient theoretical plates. A lighter fraction is distilled off the top of column 100. A heavier fraction is drained from the bottom of column 100. The heavier fraction is stored in storage tank 130 until it can be re-distilled in distillation column 100.

The heavier fraction can alternately be distilled in an optional second column 200 fitted with a reflux condenser 210 and a reboiler 220. This optional second column 220 provides the possibility to distill the refrigerant mixture in either batch or continuous modes. Not shown in FIG. 14 are temperature sensors, pressure sensors, pressure regulators, temperature regulators, mass flow controllers, process control hardware, process control software and other process details known in the art.

There are numerous streams of reclaimed materials that can be fed into the distillation process according to the disclosure. Many of the reclaimed materials are consolidated by contractors reclaimed in gas stations, HVAC shops and other small businesses where minimal or no efforts are made to isolate the different types of refrigerants including HFCs and ODS materials. Some of the more common reclaimed streams are set forth in Table 5.

TABLE 5

Reclaimed Mixed Materials.

| Components | Feed Zero (wt %) | Feed 1 (wt %) | Feed 2 (wt %) | Feed 3 (wt %) | Feed 4 (wt %) |
|---|---|---|---|---|---|
| R-134A | 15.5 | 1.20 | 2.50 | 7.50 | 11.0 |
| R-125 | 12.5 | 5.00 | 5.00 | 11.0 | 21.5 |
| R-32 | 12.5 | 5.00 | 5.00 | 11.0 | 21.5 |
| R-143A | 6.50 | 1.30 | 0.00 | 5.50 | 13.0 |
| R-22 | 50.0 | 87.5 | 87.5 | 65.0 | 33.0 |
| HC | 3.00 | 0.00 | 0.00 | 0.00 | 0.00 |
| $H_2O$ | $5 \times 10^{-5}$ | $5 \times 10^{-6}$ | $5 \times 10^{-6}$ | $5 \times 10^{-5}$ | $5 \times 10^{-5}$ |
| Total | 100 | 100 | 100 | 100 | 100 |

The following observations can be made regarding the reclaimed mixed materials set forth in Table 5:
- R-22 is the most common ODS (ozone depleting substance) because many replacement HFC products have been improperly put into systems "topping off" with HFC blends.
- Feed zero represents the most likely and worst-case scenario for much of the mixed refrigerant in the U.S. market with high content of R-143a that has a boiling point very similar to R-22 and is difficult to manage in the fractionation process.
- Highly flammable substances like butane, Isobutane and propane have been used as lubricants in a variety of refrigerant applications to replace R-22. Dealing with class 3 flammables is critical.
- Mixed materials in many cases contain R-143A (from R-404A) that is mixed at the contractor level, making fractionation very difficult and requiring unique technical solutions in fractionation and forcing the high purity R-32:R-125 mix in order to extract the components.

The distillation column(s) of the disclosure have been designed using ASPEN models and then verified by Koch-Glitsch. ASPEN is a process simulation software package used in industry. Given a process design and an appropriate selection of thermodynamic models, ASPEN uses mathematical models to predict the performance of the process. The process of the disclosure can make the 65:35 material directly off of a single first pass, utilizing waste streams of material that would otherwise be vented, and are being stored around the country or ultimately require $CO_2$ to burn in a rotary kiln.

Example 1—Feed Zero.

Feed Zero is fed into the center of the distillation column at a temperature about 140-150° F. and a pressure of about 400-420 psia. The top fraction is taken off at a temperature of about 95-105° F. and about 370-380 psia. The bottom fraction is taken off at a temperature of about 140-150° F. and a pressure of about 375-385 psia. The composition of the top and bottom fractions is shown in Table 6.

TABLE 6

Top and Bottom Fractions of Feed-0 Case (wt %).

| Component | Top Fraction (wt %) | Bottom Fraction (wt %) |
|---|---|---|
| R-32 | 91.3 | 6.95 |
| R-125 | 8.5 | 12.8 |
| R-143 | 0.264 | 6.93 |
| R-22 | $4.93 \times 10^{-7}$ | 53.5 |
| R-134 | $6.23 \times 10^{-11}$ | 16.6 |
| Oils | $2.11 \times 10^{-17}$ | 3.21 |
| Water | $1.95 \times 10^{-27}$ | $5.32 \times 10^{-7}$ |

With the system of the disclosure, and considering high volumes of R-143a in the feedstock, a final product of about 91% R-32, about 9% R-125 that has zero moisture can be packaged and sold directly into new equipment as a net zero GWP replacement for R-32. However, the final product is not suitable as a drop-in replacement for R-410A.

Example 2.—Feed 1.

Feed 1 is fed into the center of the distillation column at a temperature of about 145-155° F. and a pressure of about 400-420 psia. The top fraction is taken off at a temperature of about 95-105° F. and about 370-380 psia. The bottom fraction is taken off at a temperature of about 140-150° F. and a pressure of about 375-385 psia. The composition of the top and bottom fractions is shown in Table 7.

TABLE 7

Top and Bottom Fractions of Feed-1 Case (wt %).

| Component | Top Fraction (wt %) | Bottom Fraction (wt %) |
|---|---|---|
| R-32 | 65.3 | 0.0392 |
| R-125 | 33.6 | 2.65 |
| R-143 | 0.726 | 1.35 |
| R-22 | 0.375 | 94.7 |
| R-134 | $2.30 \times 10^{-6}$ | 1.30 |
| Oils | 0 | 0 |
| Water | $9.029 \times 10^{-19}$ | $5.41 \times 10^{-4}$ |

In this case, the top fraction yields a ratio of about 65:35 R-32:R-125, which is suitable as a direct replacement for R-410A, given a variation of about ±1% to about ±2%. The minor amounts of other components are also acceptable, since they also have a net 0 GWP. Further distillation steps can further isolate components, including an 0.9998 fraction of R-22 that can be used in R-22 compatible equipment with a net GWP of zero.

This Feed 1 is a very common mixed ODS feed stream, but difficult to process. With the columns and considering high volumes of R143a in the feedstock the disclosure obtains a final product of 65% R32 and 35% R125 that has >99.5% purity, zero moisture and can be packaged and sold directly into new equipment and as a replacement for R410A. Likewise, the technology can handle nearly all legacy mixed streams and by using the 65/35 formula which is a direct drop in for R410A, the product of the disclosure can move nearly all past refrigerants into new equipment.

Example 3.—Feed 2.

Feed 2 is fed into the center of the distillation column at a temperature of about 145-155° F. and a pressure of about 400-420 psia. The top fraction is taken off at a temperature of about 95-105° F. and about 370-380 psia. The bottom fraction is taken off at a temperature of about 140-150° F. and a pressure of about 375-385 psia. The composition of the top and bottom fractions is shown in Table 8.

TABLE 8

Top and Bottom Fractions of Feed-2 Case (wt %).

| Component | Top Fraction (wt %) | Bottom Fraction (wt %) |
|---|---|---|
| R-32 | 65.4 | 0.0385 |
| R-125 | 34.3 | 2.59 |
| R-143 | 0 | 0 |
| R-22 | 0.335 | 94.7 |
| R-134 | $4.15 \times 10^{-6}$ | 2.71 |
| Oils | 0 | 0 |
| Water | $6.71 \times 10^{-19}$ | $5.41 \times 10^{-4}$ |

In this case, the top fraction yields a ratio of about 65:35 R-32:R-125, which is suitable as a direct replacement for R-410A, given a variation of about ±1% to about ±2%. The minor amount of other components is also acceptable, since they are all used as drop-ins for R-22. Further distillation steps can further isolate components, including an 0.9998 fraction of R-22 that can be used in R-22 compatible equipment with a net GWP of zero. Further distillation steps can further isolate components, including purified fractions of R-22 and R-134A.

Feed 2 is another mixture of ODS and HFC's that can be fractionated off of the beginning of C1 and turned into a finished product.

Example 4.—Feed 3.

Feed 3 is fed into the center of the distillation column at a temperature about 140-150° F. and a pressure of about 400-420 psia. The top fraction is taken off at a temperature of 95-105° F. and about 370-380 psia. The bottom fraction is taken off at a temperature of about 135-145° F. and a pressure of about 375-385 psia. The composition of the top and bottom fractions is shown in Table 9.

TABLE 9

Top and Bottom Fractions of Feed-3 Case (wt %).

| Component | Top Fraction (wt %) | Bottom Fraction (wt %) |
| --- | --- | --- |
| R-32 | 91.0 | 5.40 |
| R-125 | 8.7 | 11.2 |
| R-143 | 0.248 | 5.87 |
| R-22 | $6.95 \times 10^{-3}$ | 69.5 |
| R-134 | $3.26 \times 10^{-7}$ | 8.02 |
| Oils | 0 | 0 |
| Water | $2.28 \times 10^{-23}$ | $5.35 \times 10^{-3}$ |

With the system of the disclosure, a final product of about 91% R-32, about 9% R-125 that has zero moisture and can be packaged and sold directly into new equipment as a replacement for R-32. However, the top fraction is not suitable as a drop-in replacement for R-410A. The bottom fraction can be subjected to further distillation steps to obtain nearly pure R-22 and R-134 that can be used in R-22 and R-134 compatible equipment with a net GWP of zero.

Example 5—Feed 4.

Feed 4 is fed into the center of the distillation column at a temperature of about 130-140° F. and a pressure of about 400-420 psia. The top fraction is taken off at a temperature of about 95-105° F. and about 370-380 psia. The bottom fraction is taken off at a temperature of about 140-150° F. and a pressure of about 375-385 psia. The composition of the top and bottom fractions is shown in Table 10.

TABLE 10

Top and Bottom Fractions of Feed-4 Case (wt %).

| Component | Top Fraction (wt %) | Bottom Fraction (wt %) |
| --- | --- | --- |
| R-32 | 49.8 | 0.0226 |
| R-125 | 42.2 | 5.75 |
| R-143 | 7.61 | 17.1 |
| R-22 | 0.381 | 57.8 |
| R-134 | $4.28 \times 10^{-5}$ | 19.4 |
| Oils | 0 | 0 |
| Water | $1.32 \times 10^{-16}$ | $8.80 \times 10^{-4}$ |

In this case, the top fraction yields a ratio of about 5:4 R-32:R-125, which is not suitable as a direct replacement for R-32. Further distillation steps can further isolate components, including purified fractions of R-22 and R-134A. Certain ODS mixed streams like Feed 4 are better to be utilized into a blended R-410A replacement than as a pure replacement to optimize energy signature.

In practice, charging the air conditioner or refrigerator with the R-410A replacement is performed using a charging cylinder designed to meter out a desired amount of a specific refrigerant by weight. Compensation for temperature variations is accomplished by reading the pressure on the gauge of the cylinder and dialing, using a calibrated chart, to the corresponding pressure reading for the refrigerant being used. When charging a refrigeration or air conditioning system with refrigerant, often the pressure in the system reaches a point where it is equal to the pressure in the charging cylinder from which the system is being charged. In order to get more refrigerant into the system to complete the charge, heat must be applied to the cylinder. In an exemplary embodiment, a standard 25 or 30 lb cylinder can be used, which is charged under pressure with the refrigerant composition of the current disclosure. This cylinder is fitted with an outlet compatible with R-32. The outlet is connected to a recharging manifold of the apparatus to be charged.

Accordingly, the disclosure has shown that a drop-in replacement for R-410A unexpectedly produces a dramatic drop in net GWP to zero while not sacrificing performance in air conditioning or refrigeration systems. Every pound of the 65:35 R-32:R-125 material used as a replacement for R-410A represents a pound of R-410A that is not manufactured, thus eliminating the 2088 GWP associated with newly manufactured R-410A. The result is to reduce or prevent anthropogenic further emissions of greenhouse gases, in the framework of the Kyoto Protocol and the Paris Agreement. The technology of the disclosure will thus assist in the decarbonization of the atmosphere.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A refrigerant composition, comprising:
about 63-66 wt % difluoromethane; and
about 33-36 wt % pentafluoroethane,
wherein the composition is formed from all recycled materials, and
the composition has a net global warming potential of about 0.

2. The refrigerant composition of claim 1, wherein the refrigerant composition comprises:
about 65 wt % difluoromethane; and
about 35 wt % pentafluoroethane.

3. The refrigerant composition of claim 1, wherein the refrigerant composition has properties similar to a mixture of 50 wt % difluoromethane and 50 wt % pentafluoroethane.

4. The refrigerant composition of claim 1, wherein the refrigerant composition has a theoretical boiling point of about −59° F.

5. The refrigerant composition of claim 1, wherein the refrigerant composition has a liquid phase pressure of about 219 psia at 70° F.

6. The refrigerant composition of claim 1, wherein the refrigerant composition has a vapor phase pressure of about 219 psia at 70° F.

7. The refrigerant composition of claim 1, wherein the refrigerant composition has a liquid phase density of about 1.045 g/cm$^3$ at 70° F.

8. The refrigerant composition of claim 1, wherein the refrigerant composition has a vapor phase density of about 0.053 g/cm$^3$ at 70° F.

9. The refrigerant composition of claim 1, wherein the refrigerant composition has a liquid phase enthalpy of about 0.235 kJ/g at 70° F.

10. The refrigerant composition of claim 1, wherein the refrigerant composition has a vapor phase enthalpy of about 0.452 kJ/g at 70° F.

11. The refrigerant composition of claim 1, wherein the refrigerant composition has a liquid phase entropy of about $6.2 \times 10^{-4}$ kJ/gR at 70° F.

12. The refrigerant composition of claim 1, wherein the refrigerant composition has a vapor phase entropy of about $1.0 \times 10^{-3}$ kJ/gR at 70° F.

13. A refrigerant mixture, comprising:
about 95-99.99 wt % of the refrigerant composition of claim 1; and
about 0.01-5 wt % lubricant.

14. The refrigerant mixture of claim 13, wherein the lubricant is selected from the group consisting of mineral oil, alkylbenzene oil and polyol ester.

15. The refrigerant mixture of claim 13, wherein the lubricant is an ester of at least one neopentyl polyol represented by the structural formula:

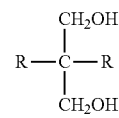

in which each R is independently selected from $CH_3$, $C_2H_5$ or $CH_2OH$.

16. The refrigerant mixture of claim 13, wherein the refrigerant mixture further comprises at least one of an ultraviolet dye or a sealant.

17. A method of preparing a refrigerant composition, comprising:
injecting a mixture of reclaimed refrigerants into a center of a distillation column, the mixture of reclaimed refrigerants comprising difluoromethane, pentafluoroethane and chlorodifluoromethane;
removing from a top of the distillation column a refrigerant composition of about 63-66 wt % difluoromethane and about 34-36 wt % pentafluoroethane; and
removing chlorodifluoromethane from a bottom of the distillation column, wherein the refrigerant composition is formed from all recycled materials, and the refrigerant composition has a net global warming potential of about 0.

18. The method of claim 17, wherein the refrigerant composition comprises about 65 wt % difluoromethane, and about 35 wt % pentafluoroethane.

19. The method of claim 17, wherein the mixture of reclaimed refrigerants further comprises 1,1,1,2-tetrafluoroethane.

20. The method of claim 17, wherein the refrigerant composition contains less than $1.0 \times 10^{-18}$ wt % $H_2O$.

* * * * *